US008087581B2

(12) United States Patent
Utsumi et al.

(10) Patent No.: US 8,087,581 B2
(45) Date of Patent: Jan. 3, 2012

(54) BANKNOTE HANDLING DEVICE

(75) Inventors: Hisayuki Utsumi, Himeji (JP); Hirokazu Goto, Himeji (JP); Isao Miki, Himeji (JP)

(73) Assignee: Glory Ltd., Himeji-shi (JP)

( * ) Notice: Subject to any disclaimer, the term of this patent is extended or adjusted under 35 U.S.C. 154(b) by 0 days.

(21) Appl. No.: 12/520,949

(22) PCT Filed: Dec. 25, 2006

(86) PCT No.: PCT/JP2006/325811

§ 371 (c)(1),
(2), (4) Date: Jun. 23, 2009

(87) PCT Pub. No.: WO2008/078382

PCT Pub. Date: Jul. 3, 2008

(65) Prior Publication Data

US 2009/0319080 A1 Dec. 24, 2009

(51) Int. Cl.
*G06Q 40/00* (2006.01)

(52) U.S. Cl. .......................................... 235/379

(58) Field of Classification Search .................. 235/375, 235/379; 705/35-45

See application file for complete search history.

(56) References Cited

U.S. PATENT DOCUMENTS

| | | | | |
|---|---|---|---|---|
| 3,432,842 | A | 3/1969 | Poznanski | |
| 4,321,671 | A * | 3/1982 | Ohsako | 705/43 |
| 5,440,107 | A | 8/1995 | Phillips | |
| 6,550,671 | B1 | 4/2003 | Brown et al. | |
| 6,978,926 | B2 | 12/2005 | Kobayashi et al. | |
| 2003/0083969 | A1 * | 5/2003 | Uchiyama et al. | 705/35 |
| 2003/0141372 | A1 | 7/2003 | Brown et al. | |
| 2004/0134839 | A1 | 7/2004 | Kobayashi et al. | |
| 2004/0182678 | A1 | 9/2004 | Ina et al. | |
| 2004/0232217 | A1 | 11/2004 | Graef et al. | |
| 2005/0263582 | A1 * | 12/2005 | Yokoi et al. | 235/379 |

FOREIGN PATENT DOCUMENTS

| | | | |
|---|---|---|---|
| EP | 1 445 740 | A2 | 8/2004 |
| JP | 2004-145600 | A | 5/2004 |
| JP | 2005-070899 | A | 3/2005 |
| JP | 2006-008982 | A | 1/2006 |
| JP | 2006-260078 | A | 9/2006 |
| WO | WO 2004/061787 | A2 | 7/2004 |

* cited by examiner

*Primary Examiner* — Daniel Hess
*Assistant Examiner* — Matthew Mikels
(74) *Attorney, Agent, or Firm* — Foley & Lardner LLP

(57) ABSTRACT

In addition to storing cassettes (16*a*) to (16*f*) that store banknotes that are dispensed when money is normally dispensed, a bait money storing portion (14) is provided that stores bait money serving as an emergency banknote to be dispensed in case of an emergency. When the bait money is requested to be dispensed in case of an emergency, the bait money is forcibly transported from the bait money storing portion (14) to a banknote outlet, with the result that the bait money is dispensed quickly.

22 Claims, 14 Drawing Sheets

BANKNOTE HANDLING DEVICE

TECHNICAL FIELD

The present invention relates to a banknote handling device that stores banknotes internally, and more particularly to a banknote handling device that stores bait banknotes separately from banknotes that are dispensed in a normal manner.

BACKGROUND ART

Money depositing/dispensing handling systems that deposit and dispense banknotes and coins mechanically and automatically are introduced into windows of financial institutions and transportation facilities and into cash desks of supermarkets, convenience stores and the like. In these money depositing/dispensing handling systems, banknote handling devices are used to deposit and dispense banknotes. These banknote handling devices include: for example, a banknote depositing/dispensing machine (see patent document 1) that is placed behind a counter of a financial institution and with which a teller deposits and dispenses cash; and a banknote handling device (see patent document 2) that is connected to a POS (point of sale) register or the like in a supermarket and that automatically dispenses change. In addition to the devices disclosed in these patent documents, there are banknote dispensing machines that only dispense banknotes.

Among these banknote handling devices, the devices that deposit and dispense banknotes are provided with a banknote storing portion for feeding and storing banknotes. There are various types of methods in which the banknote storing portion stores banknotes. These storing methods include a stack method in which a stack of banknotes is fed or stored and a winding method in which banknotes are sandwiched between two tapes and wound around a rotary drum (see patent document 3).

In the money depositing/dispensing system incorporating such a banknote handling device that is introduced with it being kept in mind that a robber forcibly enters to require money, a system is employed in which, if money is required like this, the highest priority is given to human life. As one such system in which the highest priority is given to human life, a system is utilized in which banknotes whose serial numbers or the like is previously recorded are prepared as bait banknotes (hereinafter referred to as "bait money") serving as emergency banknotes and in which, if money is required, the bait money is given so that the highest priority is given to human life and a criminal is pursued.

As a device in which such a bait money system is utilized, a POS (point of sale) resister is proposed that is provided with a clip connected to an alarm switch and that is used with the bait money held by the clip (see patent document 4). In this POS register, when the bait money held by the clip is removed from a dispensing tray, the switch connected to the clip is turned on, and thus an alarm is activated.

There is also a device in which the bait money system is utilized in the above-described banknote handling device. In this device, bait money is stored in one of banknote storing portions for storing banknotes that are deposited and dispensed, and, in case of the emergency described above, the bait money is dispensed as emergency banknotes. In such a banknote handling device, information such as serial numbers with which banknotes serving as bait money can be identified is previously recorded, and the banknotes for which this information is recorded are stored in a specific banknote storing portion.

Patent document 1: JP-A-2004-145600
Patent document 2: JP-A-2005-70899
Patent document 3: JP-A-2006-260078
Patent document 4: U.S. Pat. No. 5,440,107

DISCLOSURE OF THE INVENTION

Problems to be Solved by the Invention

Disadvantageously, however, when one of banknote storing portions is used to store bait money, the number of banknote storing portions that are normally used for depositing and dispensing money is reduced, with the result that the performance is degraded. Moreover, when this banknote storing portion is arranged far way from an outlet, it takes longer to dispense money, and the occurrence of a transport failure in a path to the outlet may prevent money from being dispensed.

Means for Solving the Problem

An object of the present invention is to provide a banknote handling device that can dispense bait money accurately and quickly in case of an emergency.

To achieve the above object, according to the invention, there is provided a banknote handling device including: a plurality of banknote storing portions storing a banknote; a banknote dispensing portion collecting and stacking a banknote to be dispensed; an emergency banknote storing portion that stores an emergency banknote to be dispensed in case of an emergency and that is disposed in a position different from that of the banknote storing portions; a transport portion transporting the banknote from the banknote storing portions or the emergency banknote storing portion to the banknote dispensing portion; and a control portion controlling transport of the emergency banknote by the transport portion so that, in case of an emergency, the emergency banknote stored in the emergency banknote storing portion is dispensed to the banknote dispensing portion.

Advantages of the Invention

According to the present invention, an emergency banknote storing portion that stores an emergency banknote to be dispensed in case of an emergency is disposed in a transport path between banknote storing portions and a banknote outlet, and thus a time period necessary to transport the emergency banknote can be reduced than when money is normally dispensed. Moreover, since the path through which the emergency banknote is transported can be decreased in length, it is possible to prevent the occurrence of a failure caused when the emergency banknote is being transported. Even if a failure is detected by a sensor portion when the emergency banknote is transported, irrespective of whether or not the failure occurs, the emergency banknote can be forcibly dispensed, with the result that the emergency banknote can be reliably dispensed in case of an emergency.

LIST OF REFERENCE SYMBOLS

Figure 1:
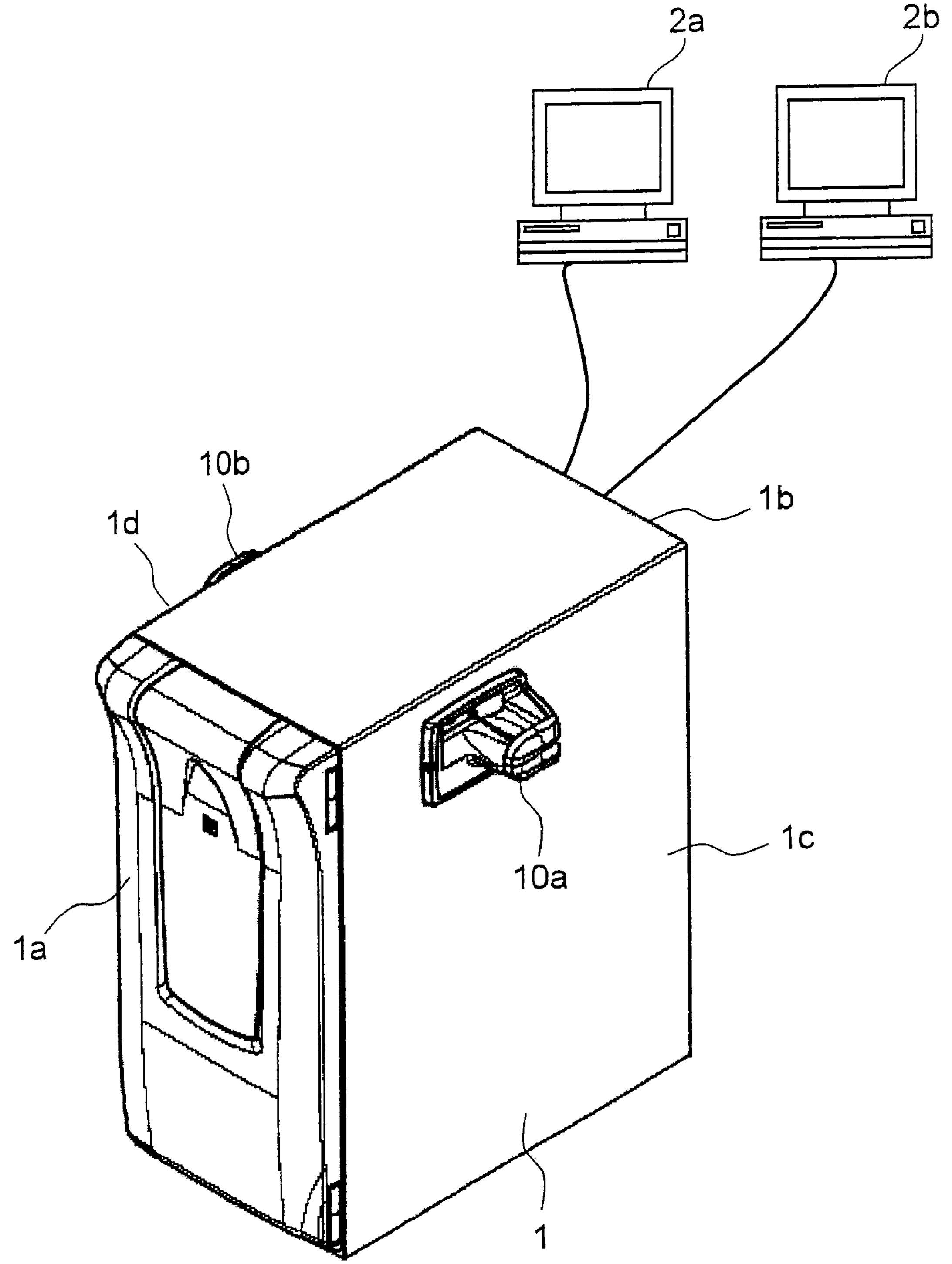
FIG. 1 An external perspective view showing the configuration of a banknote dispensing machine according to an embodiment of the present invention.

1 Banknote dispensing machine
2, 2*a* and 2*b* Higher level terminal
10*a* and 10*b* Banknote outlet
11 Escrow portion
12, 12*a*, 12*b* and 12*x* Transport path
13 Reject portion
14 Bait money storing portion
15 Sensor portion
15*a* Double note detection sensor
15*b* to 15*e* Position detection sensor
16*a* to 16*f* Storing cassette
17 Upper unit control portion
18 Lower unit control portion
19 Communication interface
19*a* Communication connector
20 Power supply unit
21 Memory
22 Operation portion
23 Display

BEST MODE FOR CARRYING OUT THE INVENTION

An embodiment of the present invention will be described below with reference to the accompanying drawings. A banknote handling device of this embodiment will be described below by way of example, using a banknote dispensing machine. The banknote dispensing machine of this embodiment is arranged at a counter of a financial institution such as a bank, more specifically, between two tellers behind the counter.

(The Configuration of the Banknote Dispensing Machine)

1. Mechanical Block

The mechanical configuration of the banknote dispensing machine of this embodiment will first be described with reference to FIG. 1, which is an external perspective view, and FIG. 2, which is a schematic cross-sectional view. As shown in FIG. 1, higher level terminals 2*a* and 2*b* operated by the tellers located on the left and right sides are connected to the banknote dispensing machine 1 of this embodiment. The higher level terminals 2*a* and 2*b* can communicate with the banknote dispensing machine 1. There are three ways of using the banknote dispensing machine 1: with only one of the higher level terminals 2*a* and 2*b*, the banknote dispensing machine 1 is used; and, with both of them, the banknote dispensing machine 1 is used.

The main body of the banknote dispensing machine 1 is configured such that, when an operation surface operated by the tellers is referred to as a front surface 1*a* and the opposite surface of the front surface 1*a* is referred to as a rear surface 1*b*, the main body is uprightly mounted with a narrow width in a lateral direction, a wide depth in a forward and backward direction and a long height in a vertical direction. In the banknote dispensing machine 1, banknote outlets 10*a* and 10*b* to which banknotes are dispensed are formed in upper portions of main body side surfaces 1*c* and 1*d*, respectively. The banknotes that are fed out to the banknote outlets 10*a* and 10*b* are taken out by the tellers, who operate the higher level terminals 2*a* and 2*b*, respectively.

Figure 2:
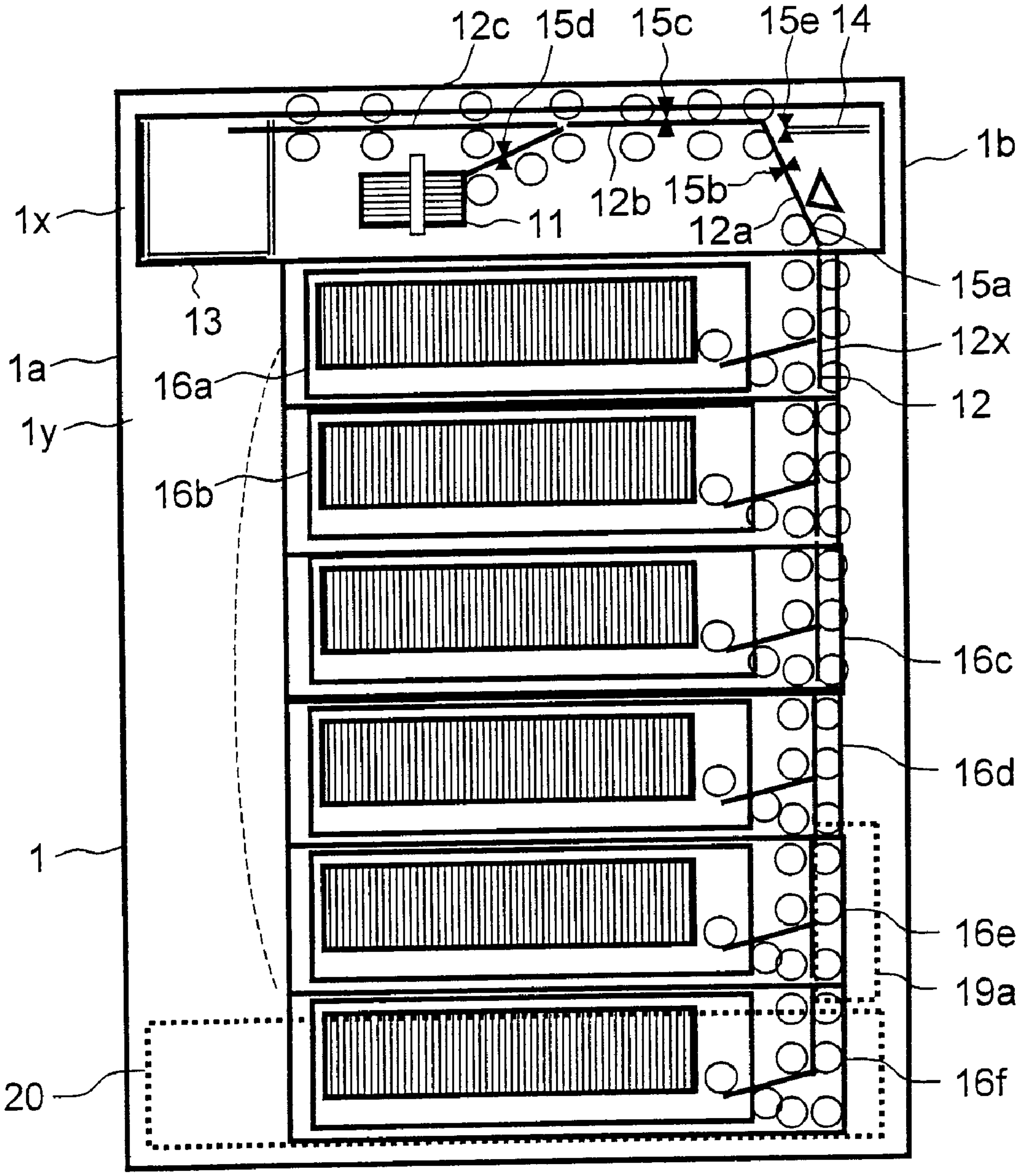
FIG. 2 A schematic cross-sectional view showing the internal configuration of the banknote dispensing machine shown in FIG. 1.

As shown in the cross-sectional view of FIG. 2, the banknote dispensing machine 1 is composed of: an upper unit 1*x* including a transport path that transports banknotes to the banknote outlets 10*a* and 10*b* (see FIG. 1); and a lower unit 1*y* including storing cassettes that store banknotes. The banknote outlets 10*a* and 10*b* are disposed in mounting positions in the upper unit 1*x*, in the main body side surfaces 1*c* and 1*d*, respectively. Specifically, the banknote outlets 10*a* and 10*b* are disposed in the main body side surfaces 1*c* and 1*d*, respectively, so as to interpose therebetween an escrow portion 11 to be described later.

The upper unit 1*x* is provided with: the escrow portion 11 that temporarily stores banknotes that are fed out to the banknote outlets 10*a* and 10*b*; the transport path 12 for transporting banknotes; a reject portion 13 for storing banknotes that fails to be transported satisfactorily due to a transport failure such as double feeding; a bait money storing portion 14 for storing a stack of a plurality of banknotes serving as bait money that is fed out in case of an emergency; a double note detection sensor 15*a* that detects double feeding in which a stack of two or more banknotes is transported from the lower unit 1*y*; and position detection sensors 15*b* to 15*e* for checking whether or not banknotes are normally transported.

The transport path 12 disposed in the upper unit 1*x* includes: a transport path 12*a* that transports a banknote transported from the lower unit 1*y* into the upper unit 1*x*; a transport path 12*b* that transports a banknote from the bait money storing portion 14 or the transport path 12*a* to the escrow portion 11; and a transport path 12*c* that branches off the transport path 12*b* and that transports a banknote to the reject portion 13. The reject portion 13, the escrow portion 11 and the bait money storing portion 14 are disposed from the front surface 1*a* to the rear surface 1*b* so as to be positioned in this order.

The double note detection sensor 15*a* is disposed around a connection between the transport path 12*a*, into which a banknote from the lower unit 1*y* is transported and a transport path 12*x* in the lower unit 1*y*. The position detection sensor 15*b* is disposed on the transport path 12*a*; the position detection sensor 15*c* is disposed on the transport path 12*b*. The position detection sensor 15*d* is disposed on the transport path 12*b* and in front of the transport inlet of the escrow portion 11; the position detection sensor 15*e* is disposed on the transport path 12*b* and in front of the transport outlet of the bait money storing portion 14.

The lower unit 1*y* is provided with: a plurality of storing cassettes 16*a* to 16*f* that store banknotes of different denominations, respectively; the transport path 12*x* that transports banknotes stored in the storing cassettes 16*a* to 16*f* to the upper unit 1*x*; a communication connector 19*a* for connection and communication with the higher level terminals 2*a* and 2*b*; and a power supply unit 20 that converts an alternating-current power from an external power supply into a direct-current power to feed it to portions of the upper unit 1*x* and the lower unit 1*y*.

2. Control Block

Figure 3:
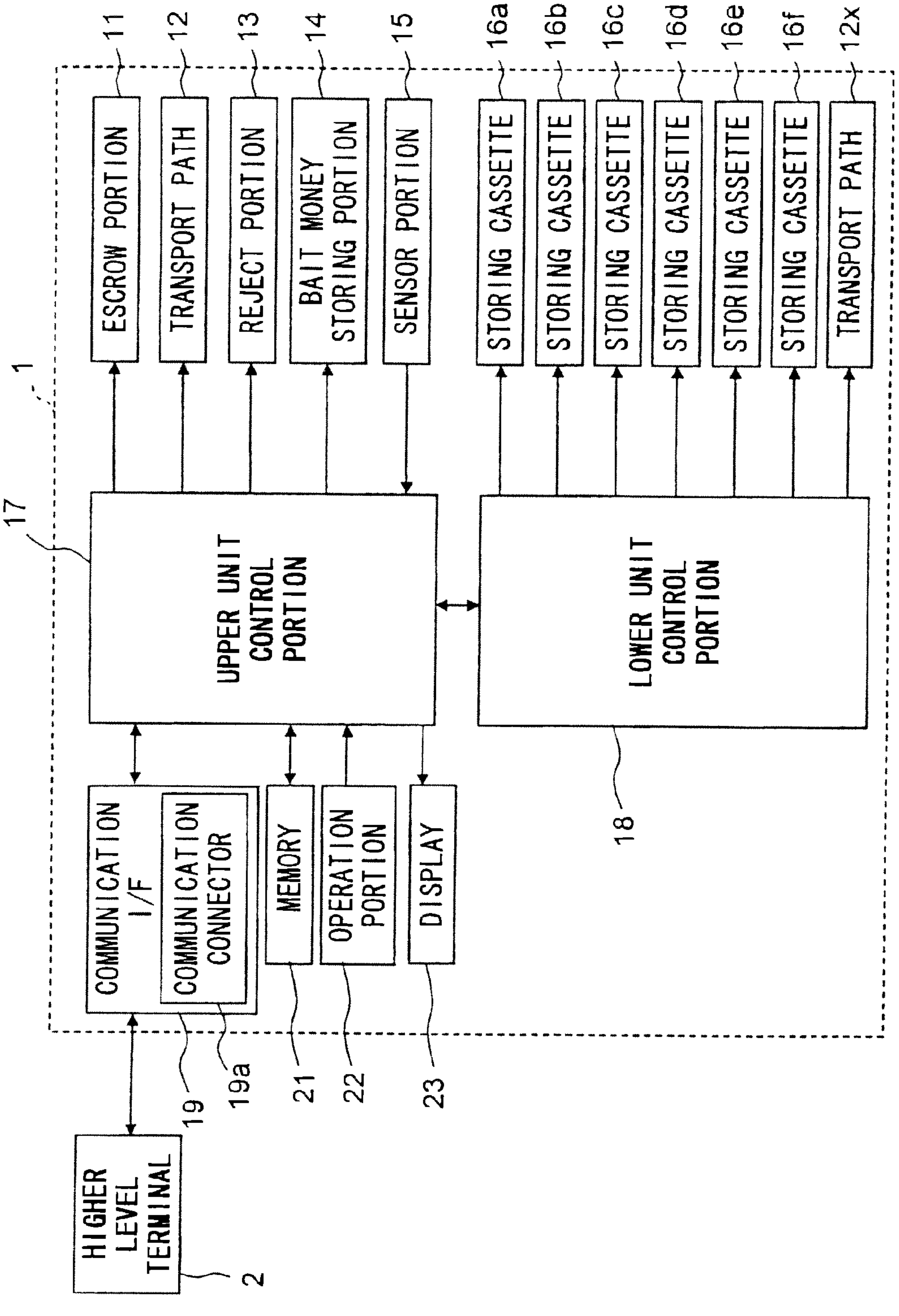
FIG. 3 A block diagram showing the internal configuration of the banknote dispensing machine shown in FIG. 1.

The control block of the banknote dispensing machine 1 including the above-described mechanical block will now be described with reference to the block diagram of FIG. 3. As shown in FIG. 3, the banknote dispensing machine 1 of this embodiment is provided with: an upper unit control portion 17 that controls operations of the blocks of the upper unit 1*x*; a lower unit control portion 18 that controls operations of the blocks of the lower unit 1*y*; a communication interface 19 that includes the communication connector 19*a* and through which to communicate with a higher level terminal 2 (equivalent to the higher level terminals 2*a* and 2*b* in FIG. 1); a memory 21 that stores identification information such as banknote numbers with which banknotes serving as the bait money stored in the bait money storing portion 14 are individually identified, information on the denominations of banknotes stored in the storing cassettes 16*a* to 16*f* and the like; an operation portion 22 through which to directly operate the banknote dispensing machine 1; and a display 23 that produces a display showing the current operational state, a detected failure or the like.

The upper unit control portion 17 controls operations such as for: transporting a banknote by the transport path 12 within the upper unit 1*x*; feeding, from the escrow portion 11, banknotes out to the banknote outlets 10*a* and 10*b*; transferring to a state in which a banknote can be taken out of the reject portion 13; feeding out the bait money from the bait money storing portion 14; and producing a display on a display 23. The upper unit control portion 17 also receives a signal from a sensor portion 15 (including the double note detection sensor 15*a* and the position detection sensors 15*b* to 15*e* in FIG. 2) to detect a banknote transport failure. This upper unit control portion 17 controls the lower unit control portion 18 and communicates with the higher level terminal 2 through the communication interface 19. Moreover, the upper unit control portion 17 receives an input signal generated by the operation of the operation portion 22 and checks the details of the operation.

The lower unit control portion 18 controlled by the upper unit control portion 17 controls operations such as for: transporting a banknote by the transport path 12*x* within the lower unit 1*y*; and feeding out banknotes from the storing cassettes 16*a* to 16*f*. The lower unit control portion 18 receives a signal from an unillustrated sensor to detect a transport failure within the lower unit 1*y*, and transmits a result obtained by detecting this transport failure to the upper unit control portion 17.

Since the control block of the banknote dispensing machine 1 is configured as described above, the upper unit control portion 17 receives a control signal through the communication interface 19 from the higher level terminal 2 of higher level, and controls operations of the blocks. As a result of the operation portion 22 being directly operated, the upper unit control portion 17 also receives a control signal corresponding to the operation of the operation portion 22, and controls operations of the blocks.

Here, when the amount of money to be dispensed is input through the operation portion 22 or the higher level terminal 2 and thus an instruction is given to perform a normal dispensing operation, the upper unit control portion 17 performs an operation to determine, according to the amount of money to be dispensed, the number of banknotes of each denomination to be dispensed. Then, the upper unit control portion 17 checks storage information stored in the memory 21 to select, from the storing cassettes 16*a* to 16*f*, storing cassettes corresponding to the denominations of the banknotes to be dispensed. Thereafter, the upper unit control portion 17 controls the lower unit control portion 18 to feed out banknotes to be dispensed from the selected storing cassettes.

In case of an emergency, when an instruction is given through the operation portion 22 or the higher level terminal 2 to dispense the bait money, a stack of a plurality of banknotes serving as the bait money stored in the bait money storing portion 14 is fed out to the transport path 12. Then, when this bait money is dispensed, if the upper unit control portion 17 detects a failure based on a signal from the sensor portion 15 (including the position detection sensors 15*b* to 15*e* in FIG. 2), it stores the details of the failure in the memory 21. These operations will be described in detail later.

(The Configuration of the Bait Money Storing Portion)

Figure 4:
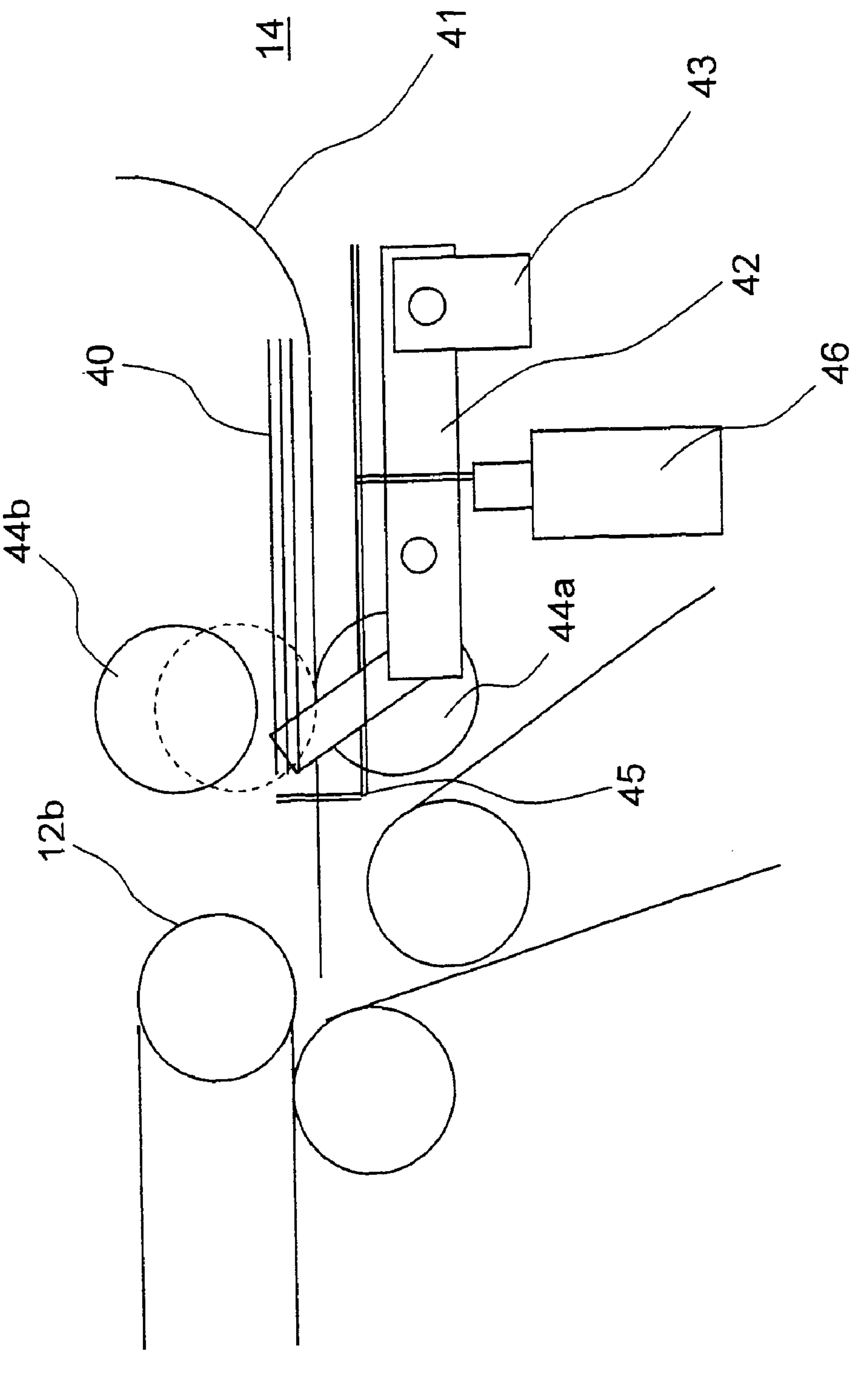
FIG. 4 A cross-sectional view showing the configuration of a bait money storing portion of the banknote dispensing machine shown in FIG. 1.

The configuration of the bait money storing portion 14 disposed in the upper unit 1*x* will now be described with reference to the schematic diagram of FIG. 4 that shows the configuration. As shown in FIG. 4, the bait money storing portion 14 is provided with: a banknote set tray 41 where the bait money 40 is placed; a banknote set detection lever 42 designed such that its curved end protrudes from the surface of the set tray 41 where the bait money 40 is to be placed and comes in contact with the bait money 40 to be placed; a banknote set detection sensor 43 for detecting, from the displacement of the banknote set detection lever 42, whether or not the bait money 40 to be placed is present; feeding rollers 44*a* and 44*b* that feed a stack of bait money 40 out to the transport path 12*b*; a stopper 45 that prevents the bait money 40 from being fed out to the transport path 12*b*; and a stopper release solenoid 46 that swings the stopper 45 either to prevent the bait money 40 from being transported to the transport path 12*b* or to allow the bait money 40 to be transported thereto.

In the bait money storing portion 14 configured as described above, when the bait money 40 is placed on the surface of the set tray 41 where the bait money 40 is to be placed, the end of the banknote set detection lever 42, which protrudes from the surface of the set tray 41 where the bait money 40 is to be placed, is pressed by the bait money 40. Thus, the banknote set detection lever 42 rotates about a position that is far away from the end in contact with the bait money 40 and at which the banknote set detection sensor 43 is disposed.

The displacement of the banknote set detection lever 42 resulting from the rotation of the banknote set detection lever 42 is detected by the banknote set detection sensor 43, and thus the bait money 40 is found to be placed in the set tray 41. Then, a signal indicating the detection by the banknote set detection sensor 43 is transmitted to the upper unit control portion 17, with the result that the upper unit control portion 17 finds the bait money 40 to be placed in the set tray 41.

When the bait money 40 is placed in the set tray 41 as described above, the bait money 40 is sandwiched between the feeding roller 44*a* fixed to an area below the set tray 41 and the feeding roller 44*b* that moves vertically so as to remain in contact with the surface of the bait money 40 placed in the set tray 41. Then, the stopper release solenoid 46 holds the stopper 45 in the upper side; the curved end of the stopper 45 protrudes from the surface of the set tray 41 where the bait money 40 is to be placed, and comes in contact with edges of the bait money 40. In this way, the stopper 45 makes contact with the bait money 40, and can thus prevent the bait money 40 from being transported to the transport path 12*b*.

When an instruction is given by the upper unit control portion 17 to transmit the bait money 40, the stopper release solenoid 46 is controlled by the upper unit control portion 17 to move the stopper 45 to the lower side. Specifically, the stopper release solenoid 46 swings the stopper 45 such that the curved end of the stopper 45, which protrudes from the surface of the set tray 41 where the bait money 40 is to be placed, is retracted into the lower side. Thus, the protrusion of the stopper 45 in contact with the edges of the bait money 40 disappears form the area between the set tray 41 and the transport path 12*b*, and accordingly the bait money 40 enters a state where it can be transported to the transport path 12*b*. Then, the upper unit control portion 17 controls the feeding rollers 44*a* and 44*b* to drive them, with the result that a stack of bait money 40 is transported from the set tray 41 to the transport path 12*b*.

(Normal Dispensing Operation)

Figure 5:
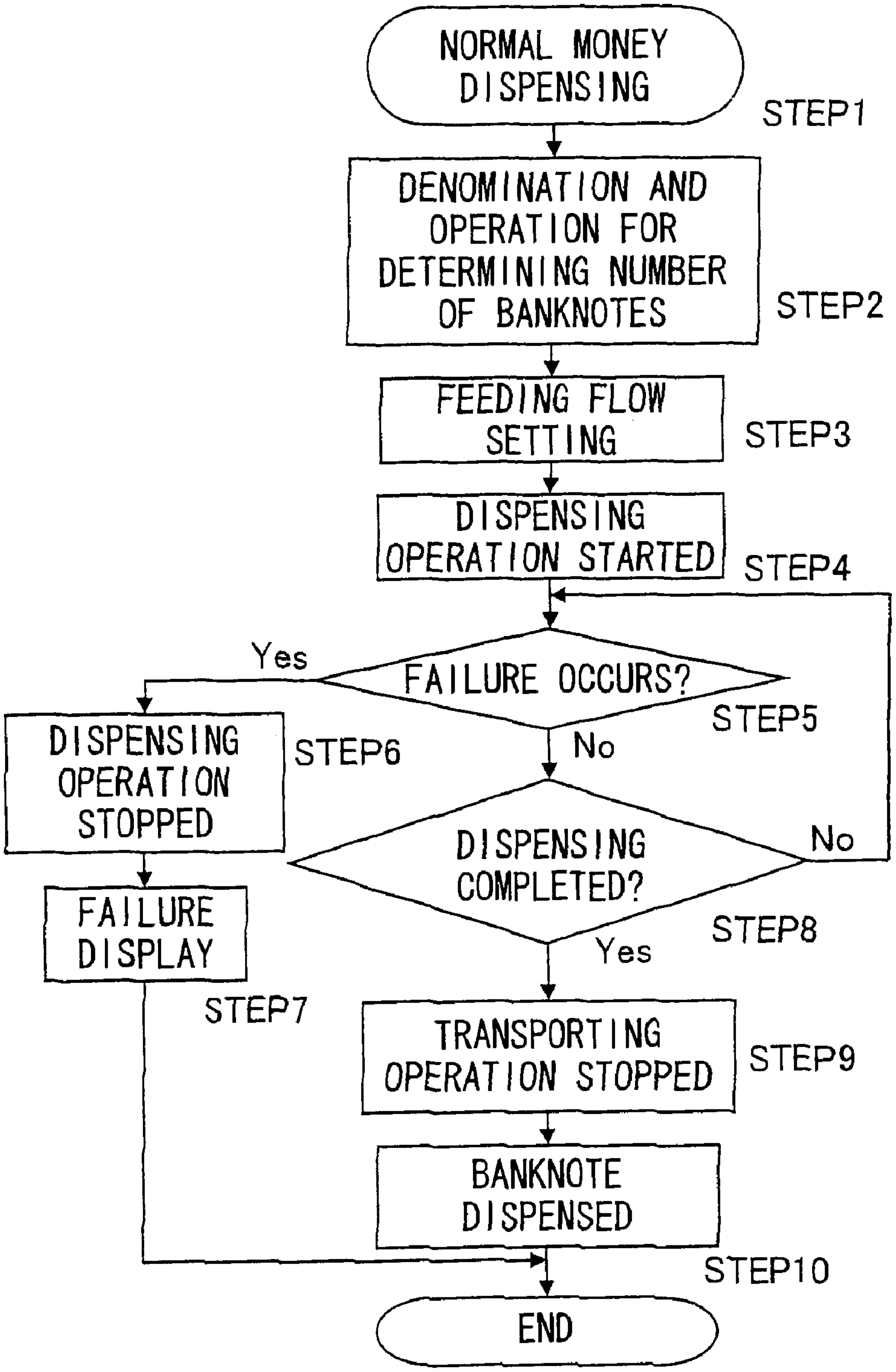
FIG. 5 A flow chart showing the main flow of the normal dispensing operation of the banknote dispensing machine shown in FIG. 1.
Figure 6:
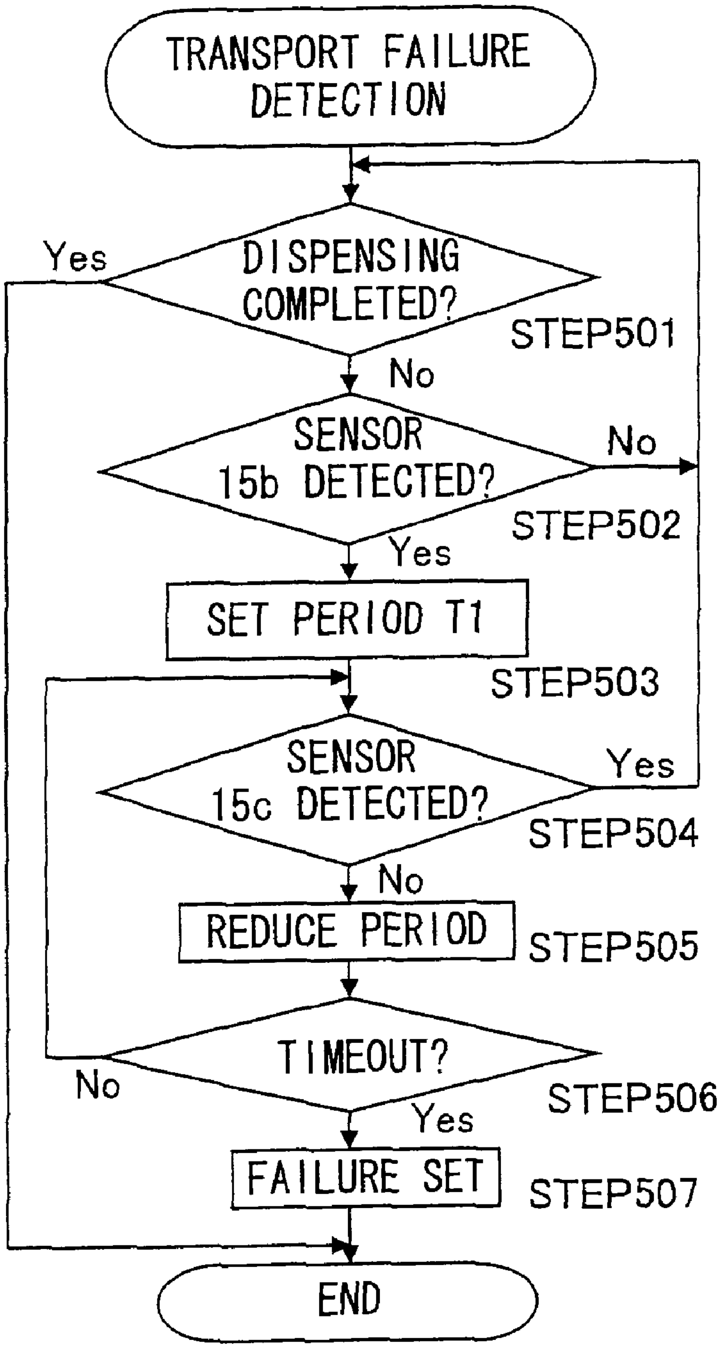
FIG. 6 A flow chart showing an operation of detecting a failure in a transport path when money is normally dispensed by the banknote dispensing machine shown in FIG. 1.
Figure 7:
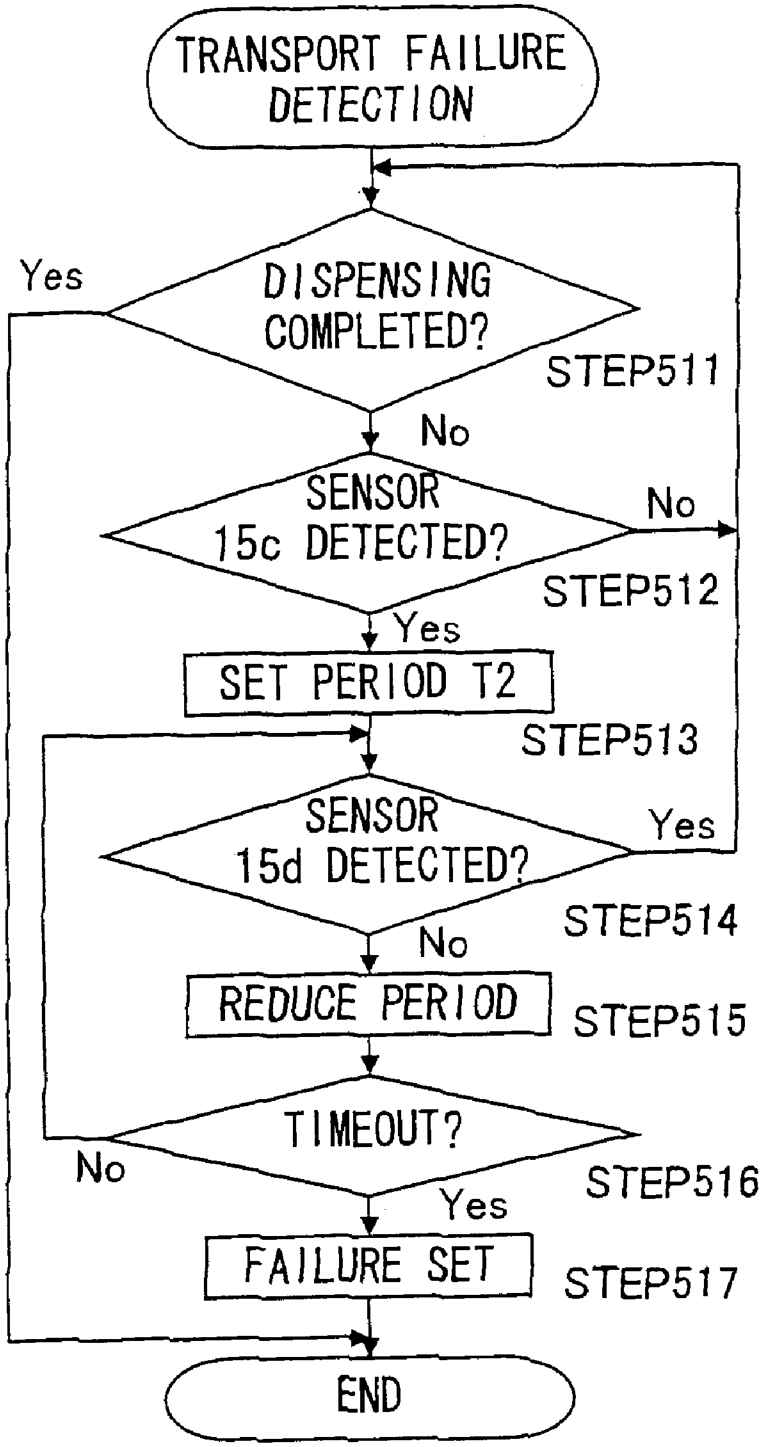
FIG. 7 A flow chart showing an operation of detecting a failure in the transport path when money is normally dispensed by the banknote dispensing machine shown in FIG. 1.
Figure 8:
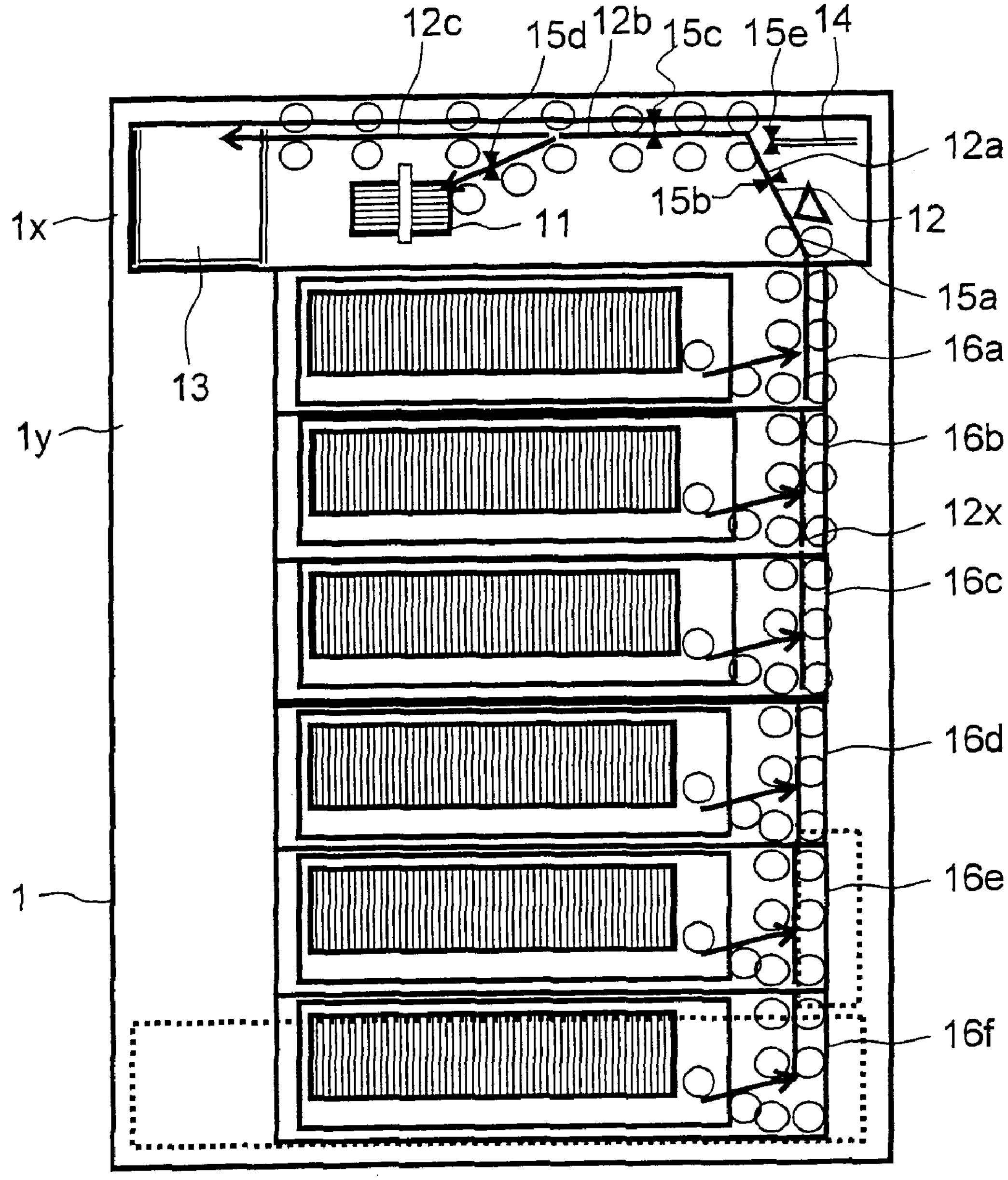
FIG. 8 A diagram showing, when money is normally dispensed by the banknote dispensing machine shown in FIG. 1, a banknote transport route within its main body.
Figure 9:
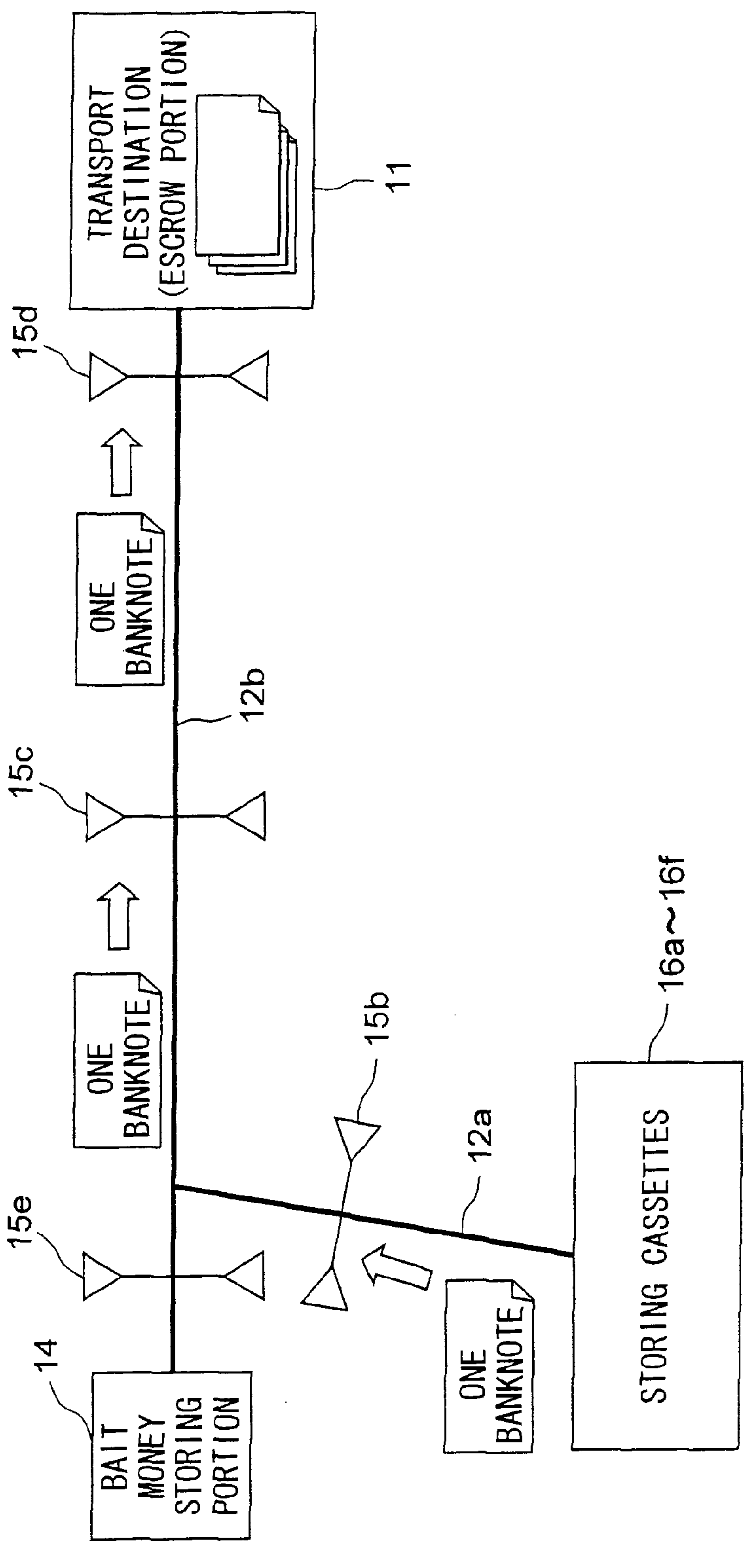
FIG. 9 A diagram showing, when money is normally dispensed by the banknote dispensing machine shown in FIG. 1, a banknote transport route within its upper unit.

The normal dispensing operation of the above-described banknote dispensing machine 1 will be described with reference to the accompanying drawings. FIG. 5 is a flowchart showing the main flow of the normal dispensing operation; FIGS. 6 and 7 are flowcharts showing the operation of detecting a failure in the transport path 12 when money is normally dispensed. FIG. 8 is a diagram showing a banknote transport route within the banknote dispensing machine 1; FIG. 9 is a diagram showing a banknote transport route in the upper unit 1*x*.

As shown in FIG. 5, when the amount of money to be dispensed is specified through the operation portion 22 or the higher level terminal 2, and an instruction is given to start the normal dispensing operation corresponding to the specified amount of money to be dispensed (step 1), the upper unit control portion 17 first performs an operation to determine, according to the amount of money to be dispensed, denominations required and the number of banknotes of the denominations (step 2). Then, based on the storage information stored in the memory 21, storing cassettes that store the banknotes of the denominations required are found among the storing cassettes 16*a* to 16*f*, and a banknote feeding flow for switching the operation of feeding out money from the associated cassette is set by the number of banknotes of each denomination (step 3).

The banknote feeding flow is set and the required number of banknotes of each denomination are fed out from the storing cassette, and the storing cassette is switched to a storing cassette for the subsequent round of feeding. In this way, the normal dispensing operation corresponding to the set feeding flow is started so that the required number of banknotes of each denomination are fed out on a denomination-by-denomination basis (step 4). In this normal dispensing operation, as shown in FIG. 8, a banknote is transported from one of the storing cassettes 16*a* to 16*f* to the transport path 12*x* in the lower unit 1*y*, and is then transported through this transport path 12*x* to the transport path 12*a* in the upper unit 1*x*.

In the upper unit 1*x*, whether or not a stack of two or more banknotes is transported to the transport path 12*a* is checked by the double note detection sensor 15*a*. Here, if the double note detection sensor 15*a* detects that a stack of two or more banknotes is transported, the upper unit control portion 17 drives the transport path 12*c*, which branches off the transport path 12*b*, and the transport path 12*c* transports, to the reject portion 13, the banknotes transported through the transport path 12*a* to the transport path 12*b*. In addition to a stack of two or more banknotes detected by the double note detection sensor 15*a*, banknotes such as one that is caught in the transport path 12 or the transport path 12*x* and that is thus folded are transported to the reject portion 13.

If a failure is not detected by the double note detection sensor 15*a*, the upper unit control portion 17 drives only the transport path 12*b*, and thus the banknote is directly transported by the transport path 12*b* to the escrow portion 11. Hence, one banknote after another is fed by the transport path 12*b* into the escrow portion 11, and the required number of banknotes of each denomination are stacked and stored according to the order of the denominations set by the feeding flow. Then, each time a signal obtained by detecting, with the position detection sensor 15*d* disposed around the transport inlet of the escrow portion 11, the feeding of a banknote into the escrow portion 11 is supplied to the upper unit control portion 17, the number of banknotes fed into the escrow portion 11 is counted. Hence, each time, based on the result of this counting, the required number of banknotes of each denomination are found by the upper unit control portion 17 to be fed in, the lower unit control portion 18 switches the storing cassettes from which banknotes are fed out.

Here, for example, when the feeding flow is set such that S2 banknotes are dispensed from the storing cassette 16*b* and then S1 banknotes are dispensed from the storing cassette 16*a*, the upper unit control portion 17 first supplies the feeding flow to the lower unit control portion 18. Then, the lower unit control portion 18 feeds banknotes out from the storing cassette 16*b* one by one. Here, if the upper unit control portion 17 finds, through the double note detection sensor 15*a* and the position detection sensors 15*b* to 15*d*, that the S2 banknotes are successfully transported to the transport path 12, the lower unit control portion 18 then stops the operation of feeding a banknote out from the storing cassette 16*b*, and banknotes are fed out from the storing cassette 16*a* one by one.

When such a normal dispensing operation is started, as shown in FIG. 9, the upper unit control portion 17 detects, from signals from the position detection sensors 15*b* to 15*d* disposed in the transport paths 12*a* and 12*b* and at the transport inlet of the escrow portion 11 in the upper unit 1*x*, whether or not a banknote transport failure occurs (step 5). The detection of the banknote transport failure from the signals from the position detection sensors 15*b* to 15*d* will be described with reference to the flowcharts of FIGS. 6 and 7.

With reference to the flowchart shown in FIG. 6, a description will first be given of an operation of detecting, from signals from the position detection sensors 15*b* and 15*c* disposed in the transport paths 12*a* and 12*b*, a banknote transport failure occurring between the position detection sensors 15*b* and 15*c*. In this operation, as shown in the flowchart of FIG. 6, the upper unit control portion 17 checks whether or not, as a result of the denomination of banknotes stored in the escrow portion 11 becoming equal to the amount of money to be dispensed, the dispensing operation is completed (step 501). Here, if the dispensing operation is found to be completed (yes), the operation of detecting a transport failure is completed.

If, in step 501, the dispensing operation is found to continue (no), the upper unit control portion 17 detects, based on whether or not the signal from the position detection sensor 15*b* is present, whether or not a banknote is transported from the transport path 12*x* to the transport path 12*a* (step 502). Here, if the signal from the position detection sensor 15*b* shows that the banknote is transported to the position where the position detection sensor 15*b* in the transport path 12*a* is disposed (yes), a time period T1 that is measured by an unillustrated timer is set (step 503).

This time period T1 is the upper limit of a time period necessary to successfully transport a banknote from the position of the position detection sensor 15*b* in the transport path 12*a* to the position of the position detection sensor 15*c* in the transport path 12*b*. Based on a time period Δt1 during which an operation in steps 504 and 505 to be described later is performed, an integral value N1 determined from T1/Δt1 may be set in step 503, and the integral value N1 may be decremented by one at a time in step 505 to be described later. In contrast, in step 503, the time period measured by the timer may be initialized to zero and a time period that has elapsed after the initialization may be measured so that the time period is determined to be equal to the predetermined time period T1 in step 506 to be described later.

As described above, if the time period measured by the unillustrated timer is set at the time period T1, based on whether or not the signal from the position detection sensor 15*c* is present, whether or not the banknote is transported from the transport path 12*a* to the transport path 12*b* is detected (step 504). The operation of checking, based on whether or not the signal from the position detection sensor 15*b* is present, whether or not the banknote is transported will be repeated in an operation shown in the flowchart of FIG. 7 to be described later.

Then, if, in step 504, the signal from the position detection sensor 15*c* shows that the banknote is transported to the position where the position detection sensor 15*c* in the transport path 12*b* is disposed (yes), the process moves to step 501 in order to check whether or not the banknote is successfully transported to the position detection sensor 15*c* in the transport path 12*b*. If, in step 502, the signal from the position detection sensor 15*b* shows that the banknote is not transported to the transport path 12*a* (no), the process also moves to step 501.

If, in step 504, the signal from the position detection sensor 15*c* showing that the banknote is transported to the position where the position detection sensor 15*c* in the transport path 12*b* is disposed is not found (no), the time period measured by the unillustrated timer is reduced only by the time period Δt1 necessary to perform the operation (step 505), and then whether or not a timeout is reached as a result of the reduced time period becoming zero is checked (step 506). Then, if, in step 506, the time period measured by the unillustrated timer is not zero (no), the process moves to step 504, where the signal from the position detection sensor 15*c* is checked. If, in step 506, the time period measured by the unillustrated timer becomes zero (yes), the upper unit control portion 17 determines that a banknote transport failure has occurred (step 507), and completes the operation of detecting the transport failure.

Specifically, whether or not the banknote is detected by the position detection sensor 15*c* during the time period T1 after the banknote is detected by the position detection sensor 15*b* is checked by repeating steps 504 to 506. If the banknote is not detected by the position detection sensor 15*c* during the time period T1, a transport failure is determined to occur between the position where the position detection sensor 15*b* in the transport path 12*a* is disposed and the position where the position detection sensor 15*c* in the transport path 12*b* is disposed.

With reference to the flowchart of FIG. 7, a description will now be given of an operation of detecting, from signals from the position detection sensors 15*c* and 15*d* disposed in the transport path 12*b* and in front of the transport inlet of the escrow portion 11, a banknote transport failure occurring between the position detection sensors 15*c* and 15*d*. In this operation, as in the operation shown in the flowchart of FIG. 6, whether or not the dispensing operation is completed is checked as shown in the flowchart of FIG. 7 (step 511), and, if the dispensing operation is found to be completed, the operation of detecting a transport failure is also completed.

If, in step 511, the dispensing operation is found to continue (no), the upper unit control portion 17 first detects, based on whether or not the signal from the position detection sensor 15*c* is present, whether or not the banknote is transported from the transport path 12*a* to the transport path 12*b* (step 512). Here, if the banknote is found to be transported to the position where the position detection sensor 15*c* in the transport path 12*b* is disposed (yes), a time period T2 measured by the unillustrated timer is set (step 513), whereas, if the banknote is found not to be transported to the position where the position detection sensor 15*c* in the transport path 12*b* is disposed (no), the process moves to step 511.

As with the above-described time period T1, the time period T2 measured by the unillustrated timer may be either incremented or decremented. Time itself may be measured, or, based on a time period Δt2 during which an operation in steps 514 and 515 to be described later is performed, an integral value N2 determined from T2/Δt2 may be either decremented or incremented, thereby measuring the time period.

Then, if, in step 513, the time period T2 is set, based on whether or not a signal from the position detection sensor 15*d* is present, whether or not the banknote is transported by the transport path 12*b* to the transport inlet of the escrow portion 11 is checked (step 514). Here, if the signal from the position detection sensor 15*d* shows that the banknote is transported to the transport inlet of the escrow portion 11 (yes), the process moves to step 511 in order to confirm whether or not the banknote is successfully transported to the transport inlet of the escrow portion 11. In contrast, if whether or not the banknote is transported to the transport inlet of the escrow portion 11 is not found (no), the time period measured by the unillustrated timer is reduced only by the time period Δt2 necessary to perform the operation (step 515), and then whether or not a timeout is reached as a result of the reduced time period becoming zero is checked (step 516).

If, in step 516, the time period measured by the unillustrated timer is not zero (no), the process moves to step 514, where the signal from the position detection sensor 15*d* is checked. If, in step 516, the time period measured by the unillustrated timer is zero (yes), the upper unit control portion 17 determines that a banknote transport failure has occurred (step 517), and completes the operation of detecting the transport failure.

Specifically, whether or not the banknote is detected by the position detection sensor 15*d* during the time period T2 after the banknote is detected by the position detection sensor 15*c* is checked by repeating steps 514 to 516. If the banknote is not detected by the position detection sensor 15*d* during the time period T2, a transport failure is determined to occur between the position where the position detection sensor 15*c* in the transport path 12*b* is disposed and the position where the position detection sensor 15*d* in front of the transport inlet of the escrow portion 11 is disposed.

As described above, in step 5, the operation is performed according to the flowcharts of FIGS. 6 and 7, and thus the position detection sensors 15*b* to 15*d* check whether or not a transport failure occurs in the transport paths including the transport paths 12*a* and 12*b* from the transport path 12*x* in the lower unit to the escrow portion 11. Then, if a transport failure is found (yes), the dispensing operation is stopped (step 6), and the display 23 produces a display showing that the transport failure occurs in the transport path (step 7), and then the operation is completed. The transport failure display may be produced on the higher level terminals 2*a* and 2*b* that are operated.

In this transport failure display, if the transport failure is detected according to the flowchart of FIG. 6, a display showing that the failure occurs between the positions where the position detection sensors 15*b* and 15*c* are disposed is produced. If the transport failure is detected according to the flowchart of FIG. 7, a display showing that the failure occurs between the positions where the position detection sensors 15*c* and 15*d* are disposed is produced.

If, in step 5, a failure is not detected in the transport path 12 (no), whether or not the dispensing operation is completed is checked according to whether or not all the banknotes corresponding to the specified amount of money are transported to the escrow portion 11 (step 8). If the dispensing operation is not found to be completed (no), the process moves to step 5, where whether or not a transport failure occurs is checked again, whereas, if the dispensing operation is found to be completed (yes), the transport operation by the transport path 12 and the operation by the lower unit 1*y* are stopped (step 9).

When the transport of a banknote by the transport path 12 and the lower unit 1*y* is stopped, the banknotes stored in the escrow portion 11 are fed out to either of the banknote outlets 10*a* and 10*b* (step 10), and then the normal dispensing operation is completed. Here, which one of the banknote outlets 10*a* and 10*b* the banknotes are fed out to may be set through the higher level terminals 2*a* and 2*b*; which one of the banknote outlets 10*a* and 10*b* the banknotes are fed out to may be set through the operation portion 22.

In the normal dispensing operation, when a banknote transported on the transport paths 12*a* and 12*b* is measured in length and thickness, and a banknote whose length is longer or shorter than a specified value or a banknote whose thickness is larger or smaller than a specified value is detected, the transport path 12*c* is driven to transport the banknote to the reject portion 13. Likewise, when the inclination of a banknote transported on the transport paths 12*a* and 12*b* (that is, the banknote is obliquely transported) is measured, and the inclination of the banknote is greater than a specified value, the transport path 12*c* is driven to transport the banknote to the reject portion 13. When the lower unit control portion 18 finds a transport failure in the transport path 12*x*, the upper unit control portion 17 is notified of the occurrence of the transport failure, then the transport failure is detected in step 5 and the process moves to step 6, where the transport operation is stopped. Although, in the above description, the denomination and the number of banknotes are set based on the input amount of money to be dispensed and then the banknotes are dispensed, banknotes may be dispensed as a result of the denomination and the number of the banknotes being specified through the higher level terminals 2*a* and 2*b* or the operation portion 22.

(An Operation of Dispensing the Bait Money)

Figure 10:
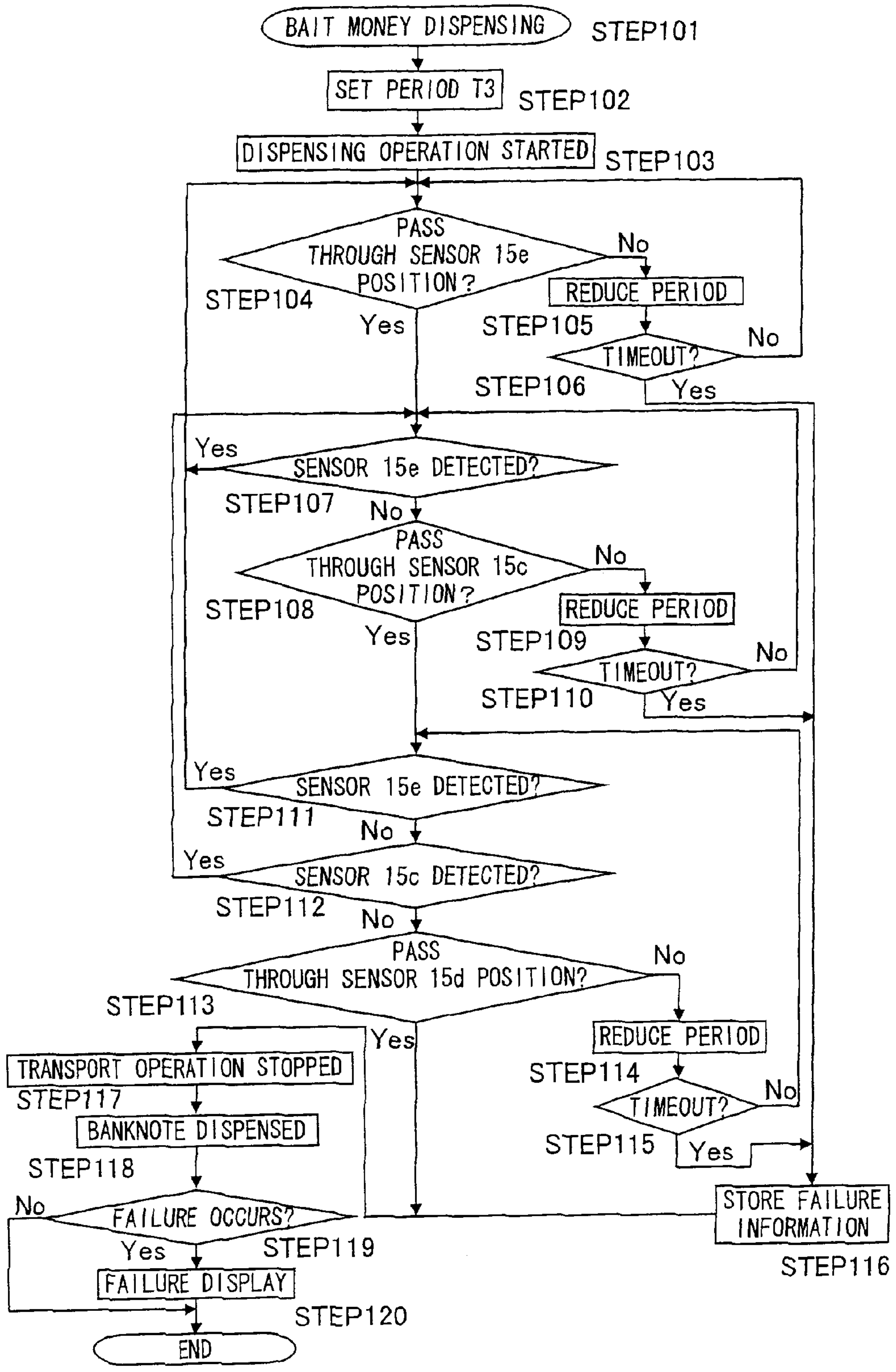
FIG. 10 A flow chart showing how the banknote dispensing machine shown in FIG. 1 dispenses the bait money.
Figure 11:
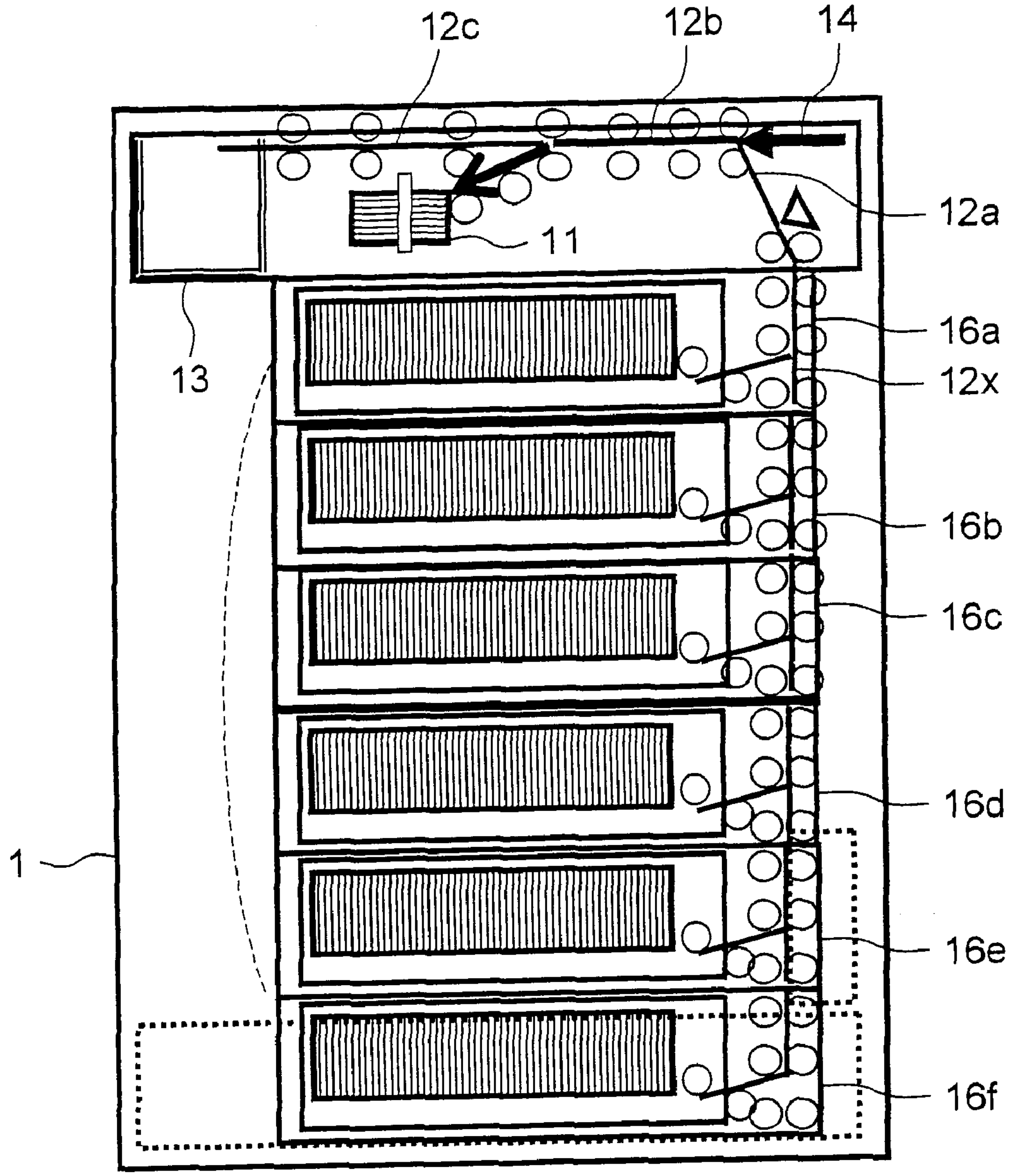
FIG. 11 A diagram showing, when the bait money is dispensed by the banknote dispensing machine shown in FIG. 1, a banknote transport route within its main body.
Figure 12:
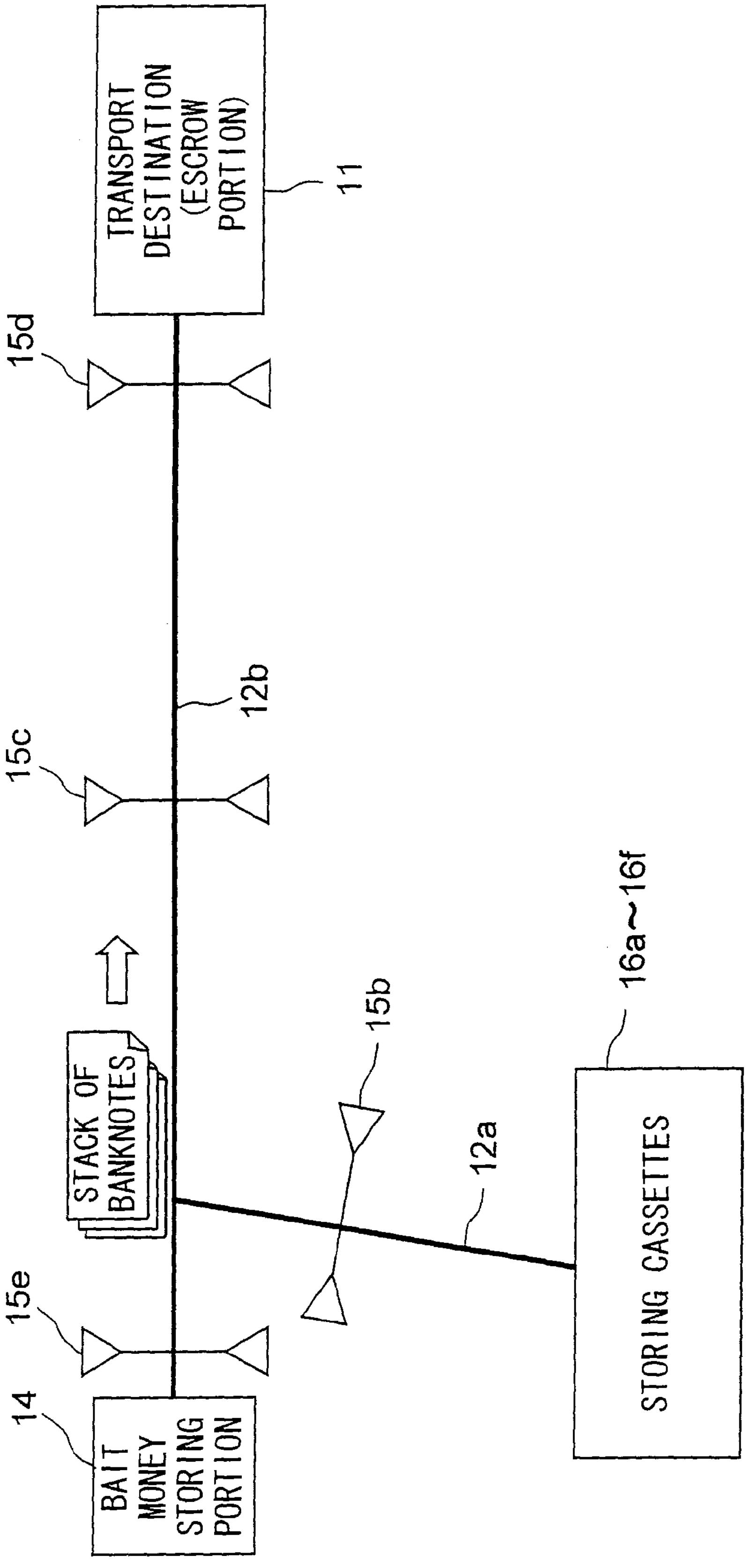
FIG. 12 A diagram showing, when the bait money is dispensed by the banknote dispensing machine shown in FIG. 1, a banknote transport route within its upper unit.

With reference to the accompanying drawings, a description will be given below of the case where the banknote dispensing machine 1, which performs the normal dispensing operation as described above, dispenses the bait money stored in the bait money storing portion 14 in case of an emergency. FIG. 10 is a flowchart showing an operation of dispensing the bait money; FIG. 11 is a diagram showing a banknote transport route within the banknote dispensing machine 1; and FIG. 12 is a diagram showing a banknote transport route in the upper unit 1*x*.

As shown in FIG. 10, when an instruction is given through the operation portion 22 or the higher level terminal 2 to start the operation of dispensing the bait money (step 101), the upper unit control portion 17 sets a time period T3 that is measured by the unillustrated timer (step 102). This time period T3 is the upper limit of a time period necessary to successfully transport a banknote from the transport outlet of the bait money storing portion 14 to the transport inlet of the escrow portion 11.

The time period may be measured by the following procedure: based on a time period Δt3 during which an operation in steps 103, 106, 107 and 110 to 112, etc. to be described later is performed, an integral value N3 determined from T3/Δt3 is set in step 102, and this integral value N3 is decremented by one at a time, thereby measuring the time period. In contrast, in step 102, the time period measured by the timer may be initialized to zero and a time period that has elapsed after the initialization of the timer may be measured so that the time period is determined to be equal to the predetermined time period T3.

When the time period is set by the unillustrated timer, the upper unit control portion 17 controls the operations of the bait money storing portion 14 and the transport path 12*b* to start the operation of dispensing the bait money (step 103). Specifically, the stopper release solenoid 46 releases the state in which the bait money 40 is prevented by the stopper 45 from being transported, then the feeding rollers 44*a* and 44*b* are driven and the bait money 40 is fed out and simultaneously the transport operation by the transport path 12*b* is started.

Then, the upper unit control portion 17 checks, based on a signal from the position detection sensor 15*e*, whether or not a stack of banknotes serving as the bait money passes through the position where the position detection sensor 15*e* is disposed, that is, the transport outlet of the bait money storing portion 14 (step 104). Specifically, the position detection sensor 15*e* checks whether or not the banknotes serving as the bait money are present in the position where the position detection sensor 15*e* in the transport path 12*b* is disposed and then disappear from the position where the position detection sensor 15*e* in the transport path 12*b* is disposed. In this way, the banknotes serving as the bait money are found to be transported from the bait money storing portion 14 to the transport path 12*b*.

If, in step 104, the stack of banknotes serving as the bait money is not found to pass through (no), the time period measured by the unillustrated timer is reduced only by the time period Δt3 necessary to perform the operation (step 105), and then whether or not a timeout is reached as a result of the reduced time period becoming zero is checked (step 106). Then, if, in step 106, the time period measured by the unillustrated timer is not zero (no), the process moves to step 104, where the signal from the position detection sensor 15*e* is checked. In operations in steps 104 to 106, the position detection sensor 15*e* checks whether or not the bait money is fed out from the bait money storing portion 14, where the bait money is originally stored.

If, in step 106, the time period measured by the unillustrated timer becomes zero (yes), the upper unit control portion 17 determines that a banknote transport failure has occurred, and stores information on the transport failure in the memory 21 (step 116). Here, the memory 21 stores the information that the transport failure has occurred in the position where the position detection sensor 15*e* is disposed, that is, the transport outlet of the bait money storing portion 14.

If, in step 104, based on the signal from the position detection sensor 15*e*, the stack of banknotes serving as the bait money is found to pass through (yes), even after the stack of banknotes serving as the bait money passes through the position where the position detection sensor 15*e* is disposed, whether or not a banknote is detected by the position detection sensor 15*e* is checked (step 107). Here, if a banknote is detected by the position detection sensor 15*e* (yes), it is determined that not all the bait money passes through, and the process moves back to step 104, where whether or not the bait money passes through is checked by the position detection sensor 15*e*. On the other hand, if a banknote is not detected by the position detection sensor 15*e* (no), based on the signal from the position detection sensor 15*c* disposed on the transport path 12*b*, whether or not the stack of banknotes serving as the bait money pass through the position where the position detection sensor 15*c* in the transport path 12*b* is disposed is checked (step 108).

If, in step 108, the stack of banknotes serving as the bait money is not found to pass through (no), as in steps 105 and 106, the time period measured by the unillustrated timer is reduced only by the time period Δt3 necessary to perform the operation (step 109), and then whether or not a timeout is reached as a result of the reduced time period becoming zero is checked (step 110). In the operation in steps 107 to 110, whether or not the bait money passes through the transport path 12*b* in motion is checked by the position detection sensor 15*c*, and whether or not a banknote failing to be transported is left is also checked by the position detection sensor 15*e*.

Then, if, in step 110, the time period measured by the unillustrated timer is not zero (no), the process moves to step 107, where the signal from the position detection sensor 15*e* is checked. On the other hand, if, in step 110, the time period measured by the unillustrated timer becomes zero (yes), the process moves to step 116, where information on the occurrence of a transport failure in the position where the position detection sensor 15*c* in the transport path 12*b* is disposed is stored in the memory 21.

If, in step 108, based on the signal from the position detection sensor 15*c*, the stack of banknotes serving as the bait money is found to pass through (yes), as in step 107, whether or not a banknote is detected by the position detection sensor 15*e*, which has found that the stack of banknotes serving as the bait money had passed through, is checked (step 111). Then, if a banknote is detected by the position detection sensor 15*e* (yes), the process moves to step 104, where whether or not the bait money passes through is checked by the position detection sensor 15*e*. On the other hand, if a banknote is not detected by the position detection sensor 15*e* (no), then whether or not a banknote is detected by the position detection sensor 15*c*, which has found that the stack of banknotes serving as the bait money had passed through, is checked (step 112).

Then, if, in step 112, a banknote is detected by the position detection sensor 15*c* (yes), the process moves to step 107, where whether or not the bait money is present is checked by the position detection sensor 15*e*. On the other hand, if a banknote is not detected by the position detection sensor 15*c* (no), based on the signal from the position detection sensor 15*d*, whether or not the stack of banknotes serving as the bait money passes through the position where the position detection sensor 15*d* at the transport inlet of the escrow portion 11 is disposed is checked (step 113).

If, in step 113, the stack of banknotes serving as the bait money is not found to pass through (no), as in steps 105, 106, 109 and 110, the time period measured by the unillustrated timer is reduced only by the time period Δt3 necessary to perform the operation (step 114), and then whether or not a timeout is reached as a result of the reduced time period becoming zero is checked (step 115). In the operation in steps 111 to 115, whether or not the bait money is fed into the escrow portion 11, into which the bait money is to be fed, is checked by the position detection sensor 15*d*, and whether or not a banknote failing to be transported is left is checked by the position detection sensors 15*c* and 15*e*.

Then, if, in step 115, the time period measured by the unillustrated timer is not zero (no), the process moves to step 111, where the signal from the position detection sensor 15*e* is checked. If, in step 115, the time period measured by the unillustrated timer becomes zero (yes), the process moves to step 116, where information on the occurrence of a transport failure at the transport inlet of the escrow portion 11 is stored in the memory 21.

If, in step 113, based on the signal from the position detection sensor 15*d*, the stack of banknotes serving as the bait money is found to pass through (yes), or, in step 116, information on transport failures occurring in the positions where the position detection sensors 15*c* to 15*e* are disposed is stored in the memory 21, the operation of dispensing the bait money is stopped (step 117). Specifically, in the bait money storing portion 14, the stopper release solenoid 46 moves the stopper 45 to prevent the bait money 40 from being transported and stops the feeding operation by the feeding rollers 44*a* and 44*b*. Then, the transport operation by the transport path 12*b* is stopped.

Thereafter, the stack of banknotes serving as the bait money stored in the escrow portion 11 is fed out to the either of the banknote outlets 10*a* and 10*b* (step 118), and then whether or not a transport failure occurs is checked based on the contents of the memory 21 (step 119). In step 118, which one of the banknote outlets 10*a* and 10*b* the bait money is fed out to may be determined through the higher level terminals 2*a* and 2*b*; which one of the banknote outlets 10*a* and 10*b* the bait money is fed out to may be determined through the operation portion 22. Alternatively, it is possible to previously determine which one of the banknote outlets 10*a* and 10*b* is used on a fixed basis.

Then, if, in step 119, the contents of the memory 21 show that a transport failure occurs (yes), the display 23 produces a display showing that a transport failure occurs in the transport path (step 120), and the operation is completed. On the other hand, if no transport failure is found (no), the bait money is considered to be normally transported, and the operation is completed.

The display that shows the transport failure in step 120 may be produced on the higher level terminals 2*a* and 2*b* that are operated. In this display showing the transport failure, in which one of the positions where the position detection sensors 15*c* to 15*e* are disposed, the transport failure occurs may be shown. Moreover, the display may show whether the transport failure results from the bait money not passing through or a banknote being left behind.

As described above, in the operation of dispensing the bait money, irrespective of whether or not a failure occurs while the bait money is transported, when a predetermined time period elapses or when the bait money is successfully transported, the bait money stored in the escrow portion 11 is forcibly dispensed to the either of the banknote outlets 10*a* and 10*b*. This predetermined time period may be checked by measuring the predetermined time period after money starts being dispensed, as describe above, or the total of time periods allowable for the bait money to pass through the position of the individual sensors may fall within the predetermined time period.

Even if a failure, other than the transport failure occurring in the transport path 12*b*, that occurs due to the length, thickness, inclination or the like of a transported banknote is detected, irrespective of the failure detected, the bait money stored in the escrow portion 11 is forcibly dispensed to the either of the banknote outlets 10*a* and 10*b*. Alternatively, it is possible to perform, when the bait money is dispensed, no detection itself for the failure other than the transport failure.

In this embodiment, even if a transport failure or the like occurs when the bait money is transported, the bait money is transported to the escrow portion 11 as continuously as possible and is then dispensed to the banknote outlets 10*a* and 10*b*. Information on various types of detected failures including the transport failure is reliably stored, as failure information, in the memory 21.

(Storage of the Bait Money)

1. A First Example of Storage

A description will be given of a first example of storage of banknotes serving as the bait money 40 in the bait money storing portion 14. When an instruction is given through the operation portion 22 or the higher level terminals 2*a* and 2*b* to store the bait money, a door (not shown) is opened that is provided in the position where the bait money storing portion 14 in the upper unit 1*x* is disposed. A stack of banknotes serving as the bait money 40 is inserted through an insertion port formed by the opening of the door, and is placed in the set tray 41.

Then, when the insertion of the bait money 40 is found by the banknote set detection sensor 43 as a result of the banknote set detection lever 42 being rotated, it is required to input information (hereinafter, "banknote identification information") for identification of banknotes, such as serial numbers for the individual banknotes serving as the bait money 40. Here, a display for requesting the input of the banknote identification information is produced on the display 23 or the higher level terminals 2*a* and 2*b*.

When, in response to this input request, the banknote identification information for the individual banknotes serving as the bait money 40 is input through the operation portion 22 or the higher level terminals 2*a* and 2*b*, the upper unit control portion 17 finds the banknote identification information input. Here, the found banknote identification information may be displayed on the display 23 or the higher level terminals 2*a* and 2*b*. Then, when the banknote identification information for the individual banknotes serving as the bait money 40 placed in the bait money storing portion 14 is stored in the memory 21 by the upper unit control portion 17, the door (not shown) provided in the position where the bait money storing portion 14 is disposed is closed, and the storage of the bait money is completed.

2. A Second Example of Storage

A description will be given of a second example of storage of banknotes serving as the bait money 40 in the bait money storing portion 14. This example differs from the first example in that banknotes stored in the storing cassettes 16*a* to 16*f* are transported as the bait money 40 to the bait money storing portion 14 and are stored therein. Here, when an instruction is given through the operation portion 22 or the higher level terminals 2*a* and 2*b* to store the bait money, the upper unit control portion 17 controls, through the lower unit control portion 18, the operation of feeding out banknotes by one of the storing cassettes 16*a* to 16*f*.

The banknotes that are fed out one by one from the selected one of the storing cassettes 16*a* to 16*f* are transported through the transport path 12*x* to the upper unit 1*x*, and are transported, through the transport path 12 in the upper unit 1*x*, to the bait money storing portion 14. In this example, there is provided, as the transport path 12 in the upper unit 1*x*, a transport path that transports the banknotes from the transport path 12*x* in the lower unit 1*y* to the bait money storing portion 14. On the transport path to the bait money storing portion 14, in order to find the banknote identification information for the banknotes transported from one of the storing cassettes 16*a* to 16*f* to the bait money storing portion 14, an unillustrated banknote identification portion for reading the banknote identification information is provided.

When an instruction is given to store the bait money, in the bait money storing portion 14, the stopper release solenoid 46 releases the state in which a banknote is prevented by the stopper 45 from being transported, with the result that a banknote can be transported through the transport path 12 to the set tray 41. Then, banknotes transported through the transport path 12 to the transport inlet of the bait money storing portion 14 are transported, by the rotation of the feeding rollers 44*a* and 44*b*, into the bait money storing portion 14 and are placed in the set tray 41.

When, as described above, banknotes transported as the bait money 40 are placed in the set tray 41 and stored in the bait money storing portion 14, the transport operation by the transport paths 12 and 12*x* and the feeding rollers 44*a* and 44*b* is completed. Thereafter, the stopper 45 is driven by the stopper release solenoid 46 to prevent a banknote from being transported into or out from the bait money storing portion 14. When banknotes transported from one of the storing cassettes 16*a* to 16*f* to the bait money storing portion 14 are stored as the bait money 40 in the bait money storing portion 14, the above-described banknote identification portion reads the banknote identification information for the individual banknotes. This banknote identification information for the banknotes serving as the bait money is found by the upper unit control portion 17 and is then stored in the memory 21.

Figure 13:
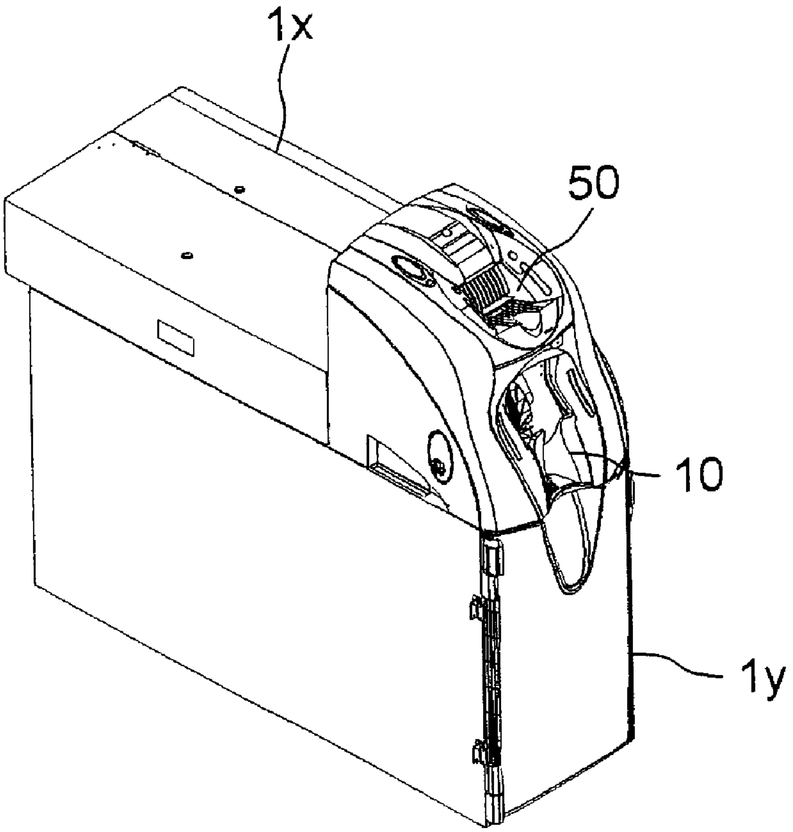
FIG. 13 An external perspective view showing an example of the configuration of a banknote depositing/dispensing machine according to the present invention.

In a case where, as in this example, the banknote identification portion for reading the banknote identification information is provided, in a device such as a banknote depositing/dispensing machine that is shown in FIG. 13 and that is provided with a banknote inlet 50, banknotes to be stored as the bait money 40 may be deposited through the banknote inlet 50. Here, the banknote inlet 50 is disposed in the upper unit 1*x*, and banknotes inserted into this banknote inlet 50 are fed out one by one and transported through the transport path 12 to the bait money storing portion 14. When the banknote is transported from the inlet to the bait money storing portion 14, the banknote identification portion reads the banknote identification information for the individual banknotes, and the banknote identification information is stored in the memory 21. In the banknote depositing/dispensing machine, which is shown in FIG. 13 by way of example, banknotes to be dispensed or the bait money is transported to a banknote outlet 10 disposed below the banknote inlet 50 and is then dispensed.

Figure 14:
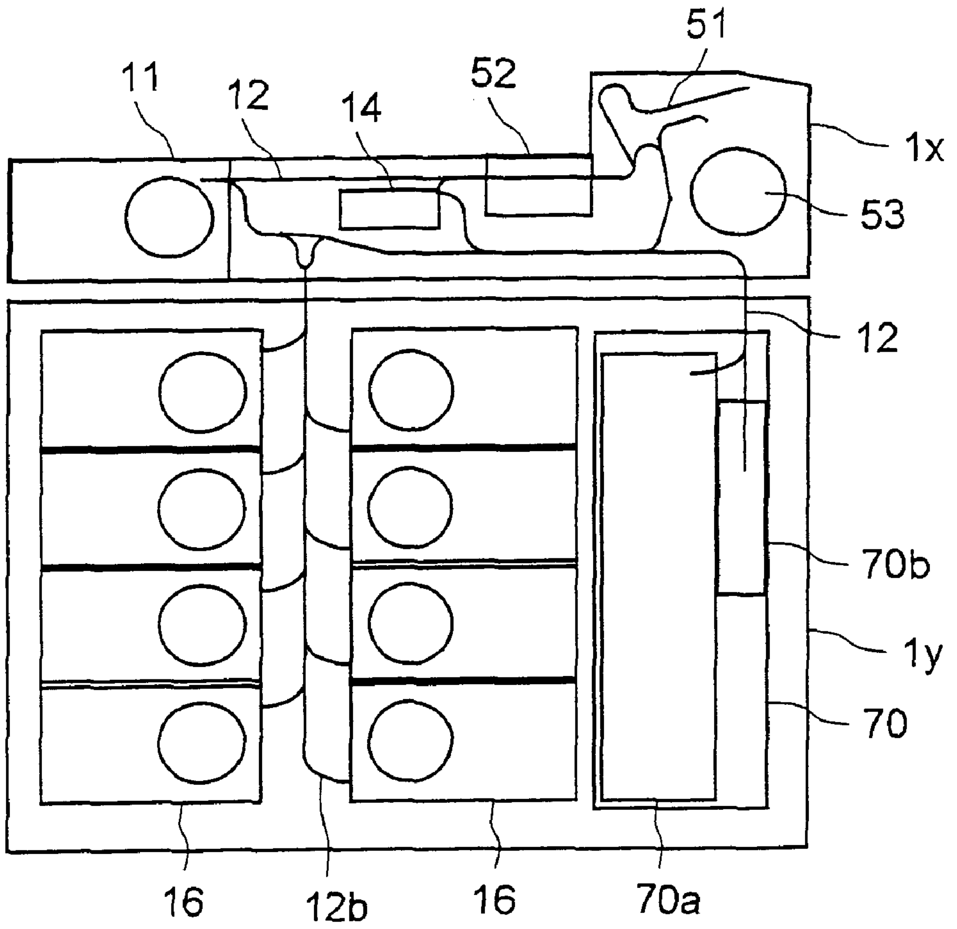
FIG. 14 A schematic cross-sectional view showing the internal configuration of the banknote depositing/dispensing machine shown in FIG. 13.

A cross-sectional view of the banknote depositing/dispensing machine shown in FIG. 13 is shown in FIG. 14. The banknote depositing/dispensing machine shown in FIG. 14 includes, in the lower unit 1*y*, not only storing cassettes 16 for storing banknotes but also a collection cassette 70. The collection cassette 70 can be removed from the lower unit 1*y* and is provided with a collection box 70*a* for collecting overflowing banknotes and a counterfeit banknote collection box 70*b* for collecting banknotes determined to be counterfeit. In the banknote depositing/dispensing machine shown in FIGS. 13 and 14, the storing cassettes 16 are formed with cassettes in which banknotes are sandwiched between two tapes and in which they are wound around the circumferential surface of a rotary drum.

In addition to the escrow portion 11 and the bait money storing portion 14, the upper unit 1*x* is provided with: a feeding portion 51 for feeding a banknote deposited into the banknote inlet 50 out to the transport path 12; an identification unit 52 for identifying the banknote identification information and authenticity of the banknote deposited through the banknote inlet 50; and a dispensing portion 53 for dispensing a banknote to the banknote outlet 10. The escrow portion 11 is used to temporarily store the banknotes dispensed from the storing cassettes 16 or the banknote deposited through the banknote inlet 50. Here, the bait money storing portion 14 is located closer to the dispensing portion 53 than the escrow portion 11.

In this configuration, when money is normally dispensed, banknotes fed out from the storing cassettes 16 are temporarily stored in the escrow portion 11, and are then dispensed through the dispensing portion 53 to the banknote outlet 10. When the bait money is dispensed, the bait money is transported from the bait money storing portion 14 to the dispensing portion 53, and is dispensed to the banknote outlet 10. When money is normally deposited, among banknotes deposited into the banknote inlet 50, banknotes that are determined to be authentic by the identification unit 52 are temporarily stored in the escrow portion 11 from the feeding portion 51, and are then distributed to the storing cassettes 16 in the lower unit 1*y* according to the type of banknote. When the bait money is deposited, the bait money deposited in the banknote inlet 50 is transported from the feeding portion 51 to the identification unit 52, where the banknote identification information is checked, and is stored in the bait money storing portion 14.

Although, in the above-described examples of the operation of storing the bait money, the banknote identification information is stored in the memory 21, it may be stored in the higher level terminals 2*a* and 2*b* so that it is controlled. Alternatively, the banknote identification information may be stored in a place other than the memory 21 and the higher level terminals 2*a* and 2*b* so that it is controlled.

Although, in the bait money storing portion 14, a portion where the bait money 40 is placed is formed with the set tray 41, a cassette that is the same as one of the storing cassettes 16*a* to 16*f* may be incorporated into the upper unit 1*x* instead. Although the bait money storing portion 14 is disposed around the rear surface 1*b* of the upper unit 1*x*, if there is a space where the bait money storing portion 14 is disposed, the bait money storing portion 14 may be disposed in such a position closer to the escrow portion 11 that the transport period is more reduced and the rate at which transport failure occurs is more reduced.

As long as the transport distance between the bait money storing portion 14 and the banknote outlets 10*a* and 10*b* is shorter than that between the storing cassettes 16*a* to 16*f* and the banknote outlets 10*a* and 10*b*, the transport path that transports the bait money from the bait money storing portion 14 to the banknote outlets 10*a* and 10*b* may differ from the transport path 12 from the storing cassettes 16*a* to 16*f* to the banknote outlets 10*a* and 10*b* or at least part thereof may overlap the transport path 12.

Although, in the above-described embodiment, the banknote dispensing machine includes the banknote storing portion of the stack method and the banknote depositing/dispensing machine includes the banknote storing portion of the winding method, the banknote dispensing machine may include the banknote storing portion of the winding method and the banknote depositing/dispensing machine may include the banknote storing portion of the stack method. Although, in the above-described embodiment, a banknote to be dispensed is temporarily stored in the escrow portion 11 and is then transported and dispensed to the banknote outlets 10*a* and 10*b*, the escrow portion 11 may be omitted such that a banknote to be dispensed or the bait money is directly transported and dispensed to the banknote outlets 10*a* and 10*b*.

INDUSTRIAL APPLICABILITY

Although the above-described embodiment is discussed by way of example, using the banknote dispensing machine that is employed by a teller of a financial institution, the present invention can be applied to a banknote depositing/dispensing machine for depositing and dispensing banknotes and a coin-counting machine for dispensing banknotes as change.

The invention claimed is:

1. A banknote handling device comprising:

a plurality of banknote storing portions configured for storing banknotes;

a banknote dispensing portion configured for stacking a banknote to be dispensed;

an emergency banknote storing portion configured for storing bait money to be dispensed in case of an emergency and that is disposed in a position different from a position of the banknote storing portions;

a transport portion configured for transporting a given banknote from one of the plurality of banknote storing portions or the bait money stored in the emergency banknote storing portion to the banknote dispensing portion; and a control portion configured for controlling transport of the bait money by the transport portion so that, in the case of the emergency, the bait money stored in the emergency banknote storing portion is dispensed to the banknote dispensing portion.

2. The banknote handling device of claim 1, further comprising:

a sensor portion that is provided in the transport portion and configured to detect a state of the given banknote or the bait money being transported in the transport portion; and a transport state determination portion configured for determining, based on an output from the sensor portion, whether or not a banknote transport failure occurs in the transport portion, wherein, when the bait money is transported from the emergency banknote storing portion to the banknote dispensing portion in the case of the emergency, irrespective of a result of the determination of the transport state determination portion, the control portion is configured to control the transport by the transport portion such that the bait money is forcibly transported to the banknote dispensing portion.

3. The banknote handling device of claim 2, further comprising a storage portion configured for storing information on the banknote transport failure that occurs in the transport portion and that is determined by the transport state determination portion.

4. The banknote handling device of claim 1, wherein the emergency banknote storing portion is disposed in such a position that a first transport distance over which the bait money is transported from the emergency banknote storing portion to the banknote dispensing portion is shorter than a second transport distance over which the given banknote is transported from the banknote storing portions to the banknote dispensing portion.

5. The banknote handling device of claim 4, wherein the transport portion is provided with a first transport path transporting the bait money from the emergency banknote storing portion to the banknote dispensing portion and a second transport path transporting the given banknote from the banknote storing portions to the banknote dispensing portion, and wherein at least a part of the first transport path overlaps at least a part of the second transport path.

6. The banknote handling device of claim 1, wherein the emergency banknote storing portion is configured to store the bait money in a form of a plurality of emergency banknotes, and wherein the transport portion is configured to transport the plurality of emergency banknotes as a stack through a transport path to the banknote dispensing portion.

7. The banknote handling device of claim 1, further comprising a storage portion configured for storing banknote identification information for identification of the bait money stored in the emergency banknote storing portion.

8. The banknote handling device of claim 1, wherein, when the bait money is dispensed from the banknote dispensing portion in the case of the emergency, the banknote handling device is configured to dispense the bait money stored in the emergency banknote storing portion from the banknote dispensing portion within a predetermined period.

9. The banknote handling device of claim 1, wherein the banknote dispensing portion comprises:

an escrow portion configured for temporarily storing the given banknote or the bait money transported from the transport portion; and an outlet configured for dispensing the given banknote or the bait money that is temporarily stored in the escrow portion.

10. The banknote handling device of claim 1, further comprising a banknote inlet through which the given banknote is deposited, wherein the banknote handling device is configured to transport the deposited given banknote through the transport portion to one of the banknote storing portions.

11. The banknote handling device of claim 10, wherein, when the bait money is deposited through the banknote inlet, the banknote handling device is configured to transport the bait money deposited through the banknote inlet through the transport portion to the emergency banknote storing portion.

12. The banknote handling device of claim 1, further comprising:

a first unit including the banknote storing portions; and a second unit including the banknote dispensing portion and the emergency banknote storing portion.

13. The banknote handling device of claim 1, further comprising an operation input portion configured to give instructions for operations.

14. The banknote handling device of claim 1, wherein the banknote handing device is connected to a higher level terminal through which instructions for operations are given, and wherein the control portion is configured to check the instructions from the higher level terminal and to perform the operations corresponding to the instructions.

15. The banknote handling device of claim 1, wherein the control portion is configured to receive a signal indicating an emergency dispensing operation, and to control transport of the bait money by the transport portion in response to the signal indicating the emergency dispensing operation.

16. The banknote handling device of claim 15, wherein the signal indicating the emergency dispensing operation is separate from a signal indicating a requested amount of banknotes to be dispensed.

17. The banknote handling device of claim 1, wherein the control portion is configured to receive a signal indicating an emergency dispensing operation and a signal indicating a non-emergency dispensing operation, and to control transport of the given banknote by the transport portion in response to the signal indicating the non-emergency dispensing operation.

18. The banknote handling device of claim 17, wherein the signal indicating the emergency dispensing operation is separate from a signal indicating a requested amount of banknotes to be dispensed.

19. The banknote handling device of claim 1, wherein the control portion is configured to receive a signal indicating the emergency that is separate from a signal indicating a requested amount of banknotes to be dispensed.

20. The banknote handling device of claim 7, wherein the banknote identification information for the bait money is a serial number of the bait money.

21. The banknote handling device of claim 7, wherein the control portion is configured to receive the banknote identification information from a higher level terminal.

22. The banknote handling device of claim 1, wherein the emergency banknote storing portion is configured for storing the bait money to be dispensed only in the case of the emergency.

* * * * *